(12) United States Patent
Kim et al.

(10) Patent No.: US 11,764,903 B2
(45) Date of Patent: Sep. 19, 2023

(54) METHOD AND APPARATUS FOR TRANSMITTING CONTROL INFORMATION IN WIRELESS COMMUNICATION SYSTEM

(71) Applicant: Samsung Electronics Co., Ltd., Suwon-si (KR)

(72) Inventors: Tae-Hyoung Kim, Seoul (KR); Young-Bum Kim, Seoul (KR); Jin-Young Oh, Seoul (KR); Seung-Hoon Choi, Seongnam-si (KR); Tae-Han Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/172,541

(22) Filed: Feb. 10, 2021

(65) Prior Publication Data

US 2021/0167892 A1    Jun. 3, 2021

Related U.S. Application Data

(63) Continuation of application No. 16/130,323, filed on Sep. 13, 2018, now Pat. No. 10,924,215.

(30) Foreign Application Priority Data

Sep. 15, 2017  (KR) .................. 10-2017-0118982
Sep. 28, 2017  (KR) .................. 10-2017-0126485

(51) Int. Cl.
*H04L 1/00*       (2006.01)
*H04W 76/27*   (2018.01)
(Continued)

(52) U.S. Cl.
CPC ............ *H04L 1/0071* (2013.01); *H04L 1/001* (2013.01); *H04L 1/0038* (2013.01);
(Continued)

(58) Field of Classification Search
CPC ..... H04L 1/0071; H04L 1/001; H04L 1/0038; H04L 1/0041; H04L 1/0072;
(Continued)

(56) References Cited

U.S. PATENT DOCUMENTS

2010/0118800 A1    5/2010  Kim et al.
2010/0195583 A1*  8/2010  Nory .................. H04L 5/0055
                                                                        370/329
(Continued)

FOREIGN PATENT DOCUMENTS

CN    102083225 A    6/2011
CN    104025531 A    9/2014
(Continued)

OTHER PUBLICATIONS

SAMSUNG: "Search Space Design", 3GPP Draft; R1-1710694 Search Space Design, Jun. 16, 2017, 3rd Generation Partnership Project (3GPP), Mobile Competence Centre, 650, route des Lucioles, F-06921 Sophia-Antipolis Cedex, France, vol. 1 RAN WG1, No. Qingdao, P.R. China; Jun. 27, 2017-Jun. 30, 2017, Jun. 16, 2017(Jun. 16, 2017), XP051304342.

(Continued)

*Primary Examiner* — Abdullahi Ahmed
(74) *Attorney, Agent, or Firm* — Jefferson IP Law, LLP

(57) ABSTRACT

A 5$^{th}$ Generation (5G) or pre-5G communication system for supporting higher data transmission rates beyond 4$^{th}$ Generation (4G) communication systems such as long term evolution (LTE) systems. A method for transmitting download control information in a communication system is provided. The method includes configuring the control information indicating at least one control channel element (CCE) including at least one resource element group (REG) unit interleaved based on the interleaving information indi-
(Continued)

cated by a higher layer signaling; and transmitting, to a user equipment (UE), the configured control information.

20 Claims, 10 Drawing Sheets

(51) Int. Cl.
  *H04L 5/00* (2006.01)
  *H04W 72/23* (2023.01)
  *H04L 1/04* (2006.01)
(52) U.S. Cl.
  CPC .......... *H04L 1/0041* (2013.01); *H04L 1/0072* (2013.01); *H04L 5/0048* (2013.01); *H04L 5/0091* (2013.01); *H04W 72/23* (2023.01); *H04W 76/27* (2018.02); *H04L 1/04* (2013.01); *H04L 5/0053* (2013.01)
(58) Field of Classification Search
  CPC ....... H04L 5/0048; H04L 5/0091; H04L 1/04; H04L 5/0053; H04L 5/0041; H04L 5/0094; H04W 72/042; H04W 76/27
  See application file for complete search history.

(56) References Cited

U.S. PATENT DOCUMENTS

| | | | |
|---|---|---|---|
| 2010/0260036 | A1 | 10/2010 | Molnar et al. |
| 2013/0107822 | A1 | 5/2013 | Papasakellariou et al. |
| 2014/0241298 | A1 | 8/2014 | Park et al. |
| 2014/0341149 | A1 | 11/2014 | Seo et al. |
| 2014/0348103 | A1 | 11/2014 | Kim et al. |
| 2015/0036560 | A1 | 2/2015 | Kim et al. |
| 2015/0092690 | A1* | 4/2015 | Seo ...................... H04L 5/0039 370/329 |
| 2015/0146639 | A1 | 5/2015 | Seo et al. |
| 2015/0146669 | A1 | 5/2015 | Tang et al. |
| 2017/0230947 | A1 | 8/2017 | Liu et al. |
| 2019/0103941 | A1* | 4/2019 | Seo ..................... H04L 25/0224 |
| 2019/0140776 | A1 | 5/2019 | Seo et al. |
| 2019/0191459 | A1* | 6/2019 | Kim ..................... H04W 74/08 |
| 2020/0008180 | A1* | 1/2020 | Jo ........................ H04W 72/042 |
| 2020/0092866 | A1* | 3/2020 | Xue ..................... H04L 5/0091 |
| 2020/0092946 | A1* | 3/2020 | Xiong .................. H04L 5/0007 |
| 2020/0119869 | A1 | 4/2020 | Taherzadeh et al. |
| 2020/0213983 | A1* | 7/2020 | Zhang .................. H04W 72/04 |
| 2021/0136770 | A1* | 5/2021 | Nakashima ....... H04W 72/0453 |

FOREIGN PATENT DOCUMENTS

| | | |
|---|---|---|
| CN | 104054293 A | 9/2014 |
| CN | 104094663 A | 10/2014 |
| CN | 104205981 A | 12/2014 |
| WO | 2013/062377 A1 | 5/2013 |

OTHER PUBLICATIONS

ERICSON: "Overview of DL Control Channel Design", 3GPP Draft; R1-1709062, May 14, 2017, 3rd Generation Partnership Project (3GPP), Mobile Competence Centre, 650, route des Lucioles, F-06921 Sophia-Antipolis Cedex, France, vol. 1 RAN WG1, No. Hangzhou, China; May 15, 2017-May 19, 2017 May 14, 2017(May 14, 2017), XP051274220.
Huawei et al: "On PDCCH-CCE-REG mapping and REG bundle", 3GPP Draft; R1-1712181, Aug. 20, 2017, 3rd Generation Partnership Project (3GPP), Mobile Competence Centre, 650, route des Lucioles, F-06921 Sophia-Antipolis Cedex, France, vol. 1 RAN WG1, No. Prague, Czech Republic; Aug. 21, 2017-Aug. 25, 2017 Aug. 20, 2017 (Aug. 20, 2017), XP051314998.
Extended European Search Report dated Jun. 3, 2020, issued in European Application No. 18856653.3.
Qualcomm Incorporated; PDCCH structure; 3GPP TSG RAN WG1 NR Ad-Hoc#2; R1-1711633; Jun. 27-30, J017; Qingdao, P.R. China.
ETRI; REG bundle size and interleaving for distributed NR-PDCCH; 3GPP TSG RAN WG1 Meeting #90; R1-17138113; Aug. 21-25, 2017; Prague, P.R. Czechia.
International Search Report with Written Opinion dated Dec. 5, 2018; International App. No. PCT/KR2018/010347.
Etri, R1-1715762, Remaining details of NR-PDCCH structure, 3GPP Tsg Ran WG1 #Ah, Nagoya Japan, Sep. 18-21, 2017.
Ntel Corporation, R1-1716305, Remaining details of NR-PDCCH structure, 3GPP Tsg Ran WG1 #Ah, Nagoya Japan, Sep. 18-21, 2017.
Korean Office Action dated Jan. 26, 2022, issued in Korean Application No. 10-2017-0126485.
Samsung, "Search Space Design", 3GPP TSG RAN WG1 NR Ad-Hoc#2, R1-1710694, Qingdao, P.R. China Jun. 27-30, 2017.
MediaTek Inc., "Discussions on search space and CORESET design_final", 3GPP TSG RAN WG1 Meeting AH_NR#3, R1-1716198, Nagoya, Japan, Sep. 18-21, 2017.
Chinese Office Action dated Feb. 15, 2023, issued in Chinese Application No. 201811080739.2.
Guangdong Oppo Mobile Telecom: "Discussion of search space design", 3GPP TSG RAN WG1 Meeting NR#3, Nagoya, Japan, Sep. 18-21, 2017, R1-1715686.
Qualcomm Incorporated: "Nested search space design", R1-1711180, 3GPP TSG RAN WG1 NR Ad-Hoc#2 Jun. 27-30, 2017, Qingdao, P.R. China.
Qualcomm Incorporated, "Nested search space design," 3GPP TSG RAN WG1 #90 R1-1713419, Aug. 21-25, 2017, Prague, Czech Republic.
Qualcomm Incorporated et al., "Draft CR on limiting the maximum number of PDCCH decoding candidates for LAA," BGPP TSG-RAN Meeting #88, R1-1703513, Athens, Greece, Feb. 13-17, 2017.
VIVO, "Remaining issues on search space design," 3GPP TSG RAN WG1 NR Ad Hoc #3 R1-1715629, Nagoya, Japan, Sep. 18-21, 2017.
European Search Report dated May 11, 2023, issued in European Application No. 23157776.8.
Notice of Allowance dated Jul. 13, 2023, issued in Chinese Application No. 201811080739.2.
Korean Office Action dated Jun. 1, 2023, issued in Korean Application No. 10-2022-0132562.

* cited by examiner

METHOD AND APPARATUS FOR TRANSMITTING CONTROL INFORMATION IN WIRELESS COMMUNICATION SYSTEM

CROSS-REFERENCE TO RELATED APPLICATION(S)

This application is a continuation application of prior application Ser. No. 16/130,323, filed on Sep. 13, 2018, which has issued as U.S. Pat. No. 10,924,215 on Feb. 16, 2021 and is based on and claims priority under 35 U.S.C. § 119(a) of a Korean patent application number 10-2017-0118982, filed on Sep. 15, 2017, in the Korean Intellectual Property Office, and is based on and claims priority under 35 U.S.C. § 119(a) of a Korean patent application number 10-2017-0126485, filed on Sep. 28, 2017, in the Korean Intellectual Property Office, the disclosure of which is incorporated by reference herein in its entirety.

BACKGROUND

1. Field

The disclosure relates to wireless communication systems. More particularly, the disclosure relates to methods and apparatuses for transmitting download control channels.

2. Description of Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra high frequency bands millimeter wave (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for transmitting download control information in a communication system.

According to the disclosure, $5^{th}$ Generation (5G) wireless communication systems support methods for transmitting download control channels, particularly distributed or interleaving transmission methods and localized or non-interleaving transmission methods. Distributed transmission methods may adopt interleaver or distributed mapping to maximize frequency-axis diversity. The resource distribution for a particular download control channel may be carried out in resource element group (REG) bundle size. At this time, one or more control resource sets (CORESETs) may be set in the system bandwidth, and control regions set with different system parameters may be configured to overlap on the same time/frequency resource. In this case, in the overlapping resource regions, the control channel distribution method for one control region may influence the transmission of the download control channel in another control region, and thus, an efficient design is needed given the trade-off between the blocking probability and diversity.

According to the disclosure, minimizing power consumption due to the user equipment (UE)'s blind decoding is very critical in designing the search space of the 5G download control channel. To that end, upon blind decoding each control channel candidate, it may be considered to reuse the channel estimation value used for prior decoding. For that purpose, the search space may be designed so that a higher aggregation level of search space is constituted of a set of lower aggregation levels, for example. Such search space structure may be called a nested structure. According to the disclosure, there is proposed designing a search space considering the nested structure. According to the disclosure, the whole search space may be constituted of multiple partial search spaces, and each partial search space may be constituted of the same number of physical downlink control channel (PDCCH) candidates. In other words, each partial search space may be configured in the same form as possible. The proposed structure may ensure an even performance for each partial search space when adjusting the number of times of blind decoding with a scaling factor.

Further, the demodulation reference signal (DMRS) may be transmitted for decoding the 5G download control channel. A sequence available for the DMRS should be agreed on between the base station (BS) and the UE. In a possible method, a pre-defined unique identity (ID), e.g., cell ID or UE ID (e.g., radio network temporary identifier (RNTI)) may be used, or the value may be set for each UE via higher layer signaling (e.g., radio resource control (RRC) signaling). According to the disclosure, there is also proposed a DMRS sequence determining method considering the inter-Tx/Rx point (TRP) index or synchronization signal block index, component carrier index, or bandwidth partial index to randomize, e.g., (TRP) interference, beam interference, or long term evolution (LTE) co-existence interference.

Additional aspects will be set forth in part in the description which follows and, in part, will be apparent from the description, or may be learned by practice of the presented embodiments.

In accordance with an aspect of the disclosure, a method for transmitting download control information in a communication system comprises performing mapping so that resource group units in a distributed control channel are distributed in a time and frequency resource in a control region and transmitting the download control information using the mapped resource.

According to the disclosure, there is proposed an effective interleaving method for distributed download control channels in a 5G communication system, which may raise the diversity gain for the download control channel while effectively reducing the blocking probability.

According to the disclosure, the proposed structure may ensure an even performance for each partial search space when adjusting the number of times of blind decoding with a scaling factor.

According to the disclosure, the proposed method may effectively randomize inter-beam interference or inter-TRP interference.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure and many of the attendant aspects thereof will be readily obtained as the same becomes better understood by reference to the following detailed description when considered in connection with the accompanying drawings, in which.

Throughout the drawings, like reference numerals will be understood to refer to like parts, components, and structures.

DETAILED DESCRIPTION

Figure 1:
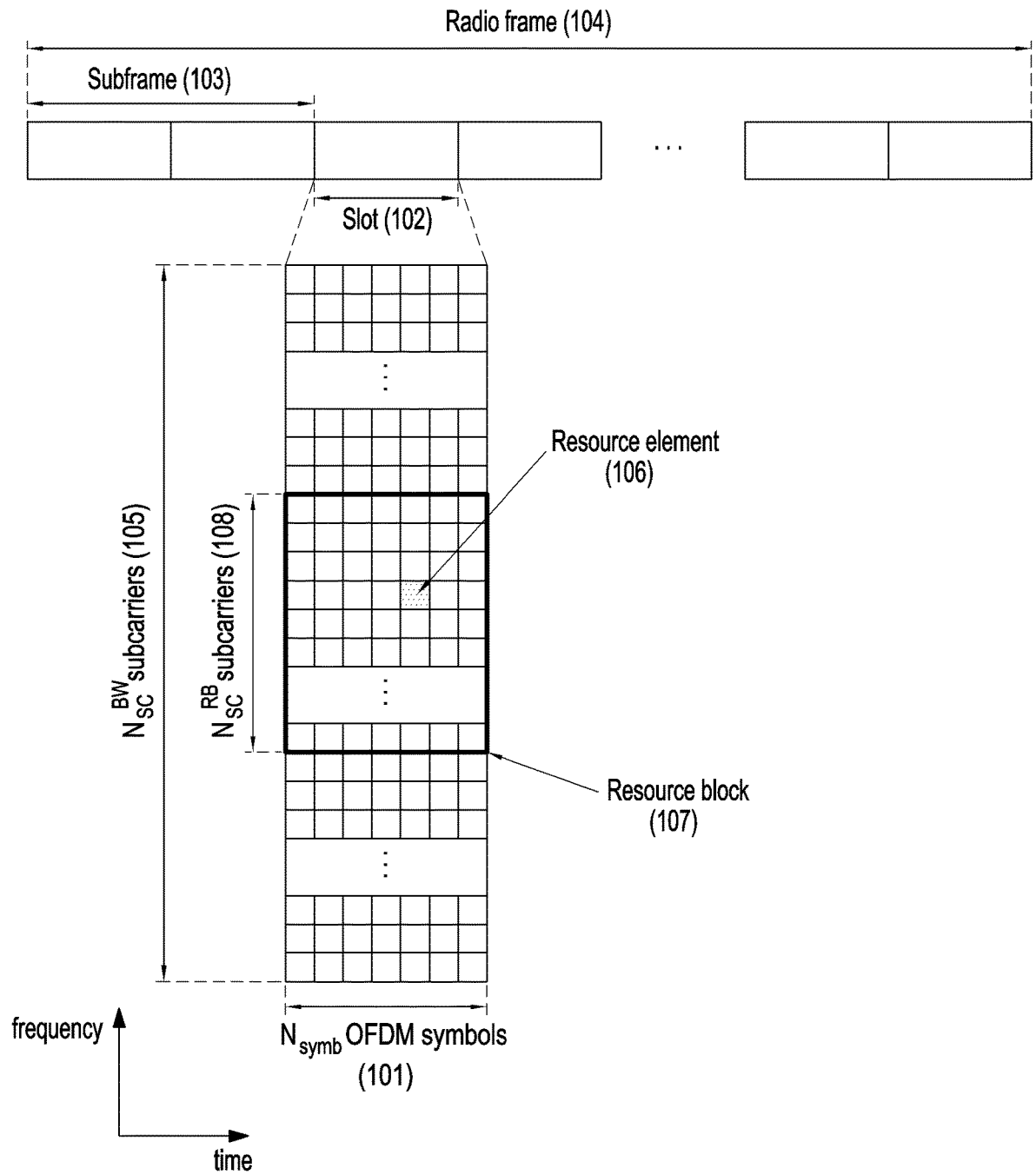
FIG. 1 is a view illustrating a basic structure of a time/frequency region in long term evolution (LTE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra mobile broadband (UMB), and institute of electrical and electronics engineers (IEEE) 802.16e communication standards.

As a representative example of such broadband wireless communication system, LTE system adopts orthogonal frequency division multiplexing (OFDM) for downlink and single carrier frequency division multiple access (SC-FDMA) for uplink. Uplink means a wireless link where the user equipment (UE) (or mobile station (MS) transmits data or control signals to the base station (BS, or evolved node B (eNode B)), and download means a wireless link where the BS transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that simultaneously meet various requirements. Services considered for 5G communication systems include, e.g., enhanced mobile broadband (eMBB), massive machine type communication (mMTC), and ultra reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), need to further be enhanced. While LTE currently adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it requires much broader coverage as compared with other services that the 5G communication system provides. mMTC-supportive UEs, due to the need for being low cost and difficulty in frequently exchanging batteries, are required to have a very long battery life, e.g., 10 years to 15 years.

URLLC is a mission-critical, cellular-based wireless communication service. For example, URLLC may be considered for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of $10^{-5}$ or less. Thus, for URLLC-supportive services, the 5G communication system is required to provide a shorter transmit time interval (TTI) than those for other services while securing reliable communication links by allocating a broad resource in the frequency band.

The three 5G services, i.e., eMBB, URLLC, and mMTC, may be multiplexed in one system and be transmitted. In this case, the services may adopt different TX/RX schemes and TX/RX parameters to meet their different requirements.

The frame architecture for the LTE and LTE-A system is described below with reference to the drawings.

FIG. 1 is a view illustrating a basic structure of time-frequency domain which is radio resource domain where the data or control channel is transmitted on downlink in the LTE system according to an embodiment of the disclosure.

Referring to FIG. 1, the horizontal axis refers to the time domain, and the vertical axis refers to the frequency domain. In the time domain, the minimum transmission unit is an OFDM symbol, and Nsymb (101) OFDM symbols come together to configure one slot 102, and two slots come together to configure one subframe 103. The slot is 0.5 ms long, and the subframe is 1.0 ms long. The radio frame 104 is a time domain unit consisting of ten subframes. In the frequency domain, the minimum transmission unit is subcarrier, and the bandwidth of the overall system transmission band consists of a total of NBW (105) subcarriers. The basic resource unit in the time-frequency domain is resource element 106 (RE), and this may be represented in OFDM symbol index and subcarrier index. Resource block 107 (RB) or physical resource block (PRB) is defined with Nsymb (101) continuous OFDM symbols in the time domain and NRB (108) continuous subcarriers in the frequency domain. Accordingly, one NRB 108 includes Nsymb×NRB REs (106). Generally, the minimum transmission unit of data is RB. Generally in the LTE system, Nsymb=7, NRB=12, and, NBW and NRB are proportional to the bandwidth of system transmission band.

Now described is the download control information (DCI) in the LTE and LTE-A system.

In the LTE system, the scheduling information on downlink data or uplink data is transferred through downlink control information (DCI) from the BS to the terminal. Various formats may be defined for the DCI. For example, pre-defined DCI formats may be applied depending on whether the scheduling information is for uplink data or download data, whether the DCI is a compact DCI of which the size of control information is small, whether spatial multiplexing using multiple antennas applies, or whether the DCI is for power control. For example, DCI format 1, which is the scheduling control information about download data may be configured to include the following pieces of control information.

Resource allocation type 0/1 flag: notifies whether resource allocation type is type 0 or type 1. Type 0 allocates resources in RBG (resource block group) units by applying bitmap scheme. In the LTE system, the basic unit of scheduling is RB (resource block) represented in time and frequency domain resources, and RBG consists of a plurality of RBs and becomes the basic unit of scheduling in the type 0 scheme. Type 1 allows for allocation of a particular RB in the RBG.

RB assignment: notifies RB allocated for data transmission. A resource is represented according to system bandwidth and a resource allocation scheme is determined.

Modulation and coding scheme (MCS: notifies the size of transport block that is data to be transmitted and modulation scheme used for data transmission.

Hybrid automatic repeat request (HARQ) process number: notifies process number of HARQ.

New data indicator: notifies whether HARQ initial transmission or re-transmission.

Redundancy version: notifies redundancy version of HARQ.

Transmit power control (TPC) command for physical uplink control channel (PUCCH): notifies transmit power control command for uplink control channel PUCCH.

As set forth above, the DCI transmitted via the download control channel contains the following information.

Download scheduling assignment: control information related to PDSCH resource designation, transmission format, HARQ information, or spatial multiplexing.

Uplink scheduling grant: physical uplink shared channel (PUSCH) resource designation, transmission format, HARQ information, or PUSCH power control.

Power control commands for UE set: Different pieces of control information typically have different DCI message sizes and these are classified in different DCI formats. The DCI formats are briefly described. The download scheduling assignment information is transmitted in DCI format 1/1A/2/1C/1D/2/2A/2B/2C, the uplink scheduling grant is transmitted in DCI format 0/4, and the power control command is transmitted in DCI format 3/3A. In general, since multiple UEs are simultaneously scheduled for the download and uplink, multiple DCI transmissions are simultaneously carried out.

The DCI undergoes channel coding and modulation and is transmitted through downlink physical control channel physical downlink control channel (PDCCH) or enhanced PDCCH (EPDCCH).

The cyclic redundancy check (CRC) is added to the DCI message payload, and the CRC is scrambled with the radio network temporary identifier (RNTI) that is the identity of the UE. Different RNTIs are used for the purposes of the DCI message, e.g., UE-specific data transmission, power control command, or random access response. The RNTI is not explicitly transmitted, but the RNTI is included in the CRC calculation process and transmitted. Upon receiving the DCI message transmitted on the PDCCH, the UE identifies the CRC using the allocated RNTI, and when the CRC is identified to be correct, the UE may be aware that the message has been transmitted thereto.

The download control channels for the LTE and LTE-A system are described below in detail with reference to the drawings.

Figure 2:
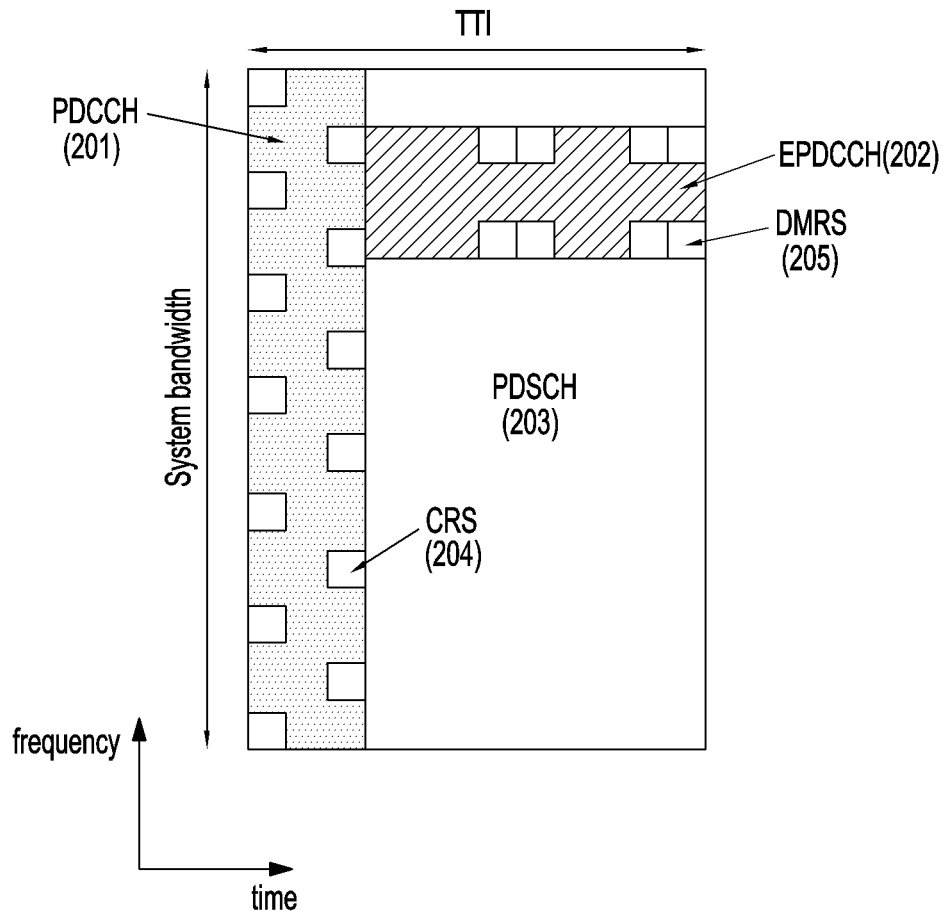
FIG. 2 is a view illustrating a physical downlink control channel (PDCCH) and an enhanced physical downlink control channel (EPDCCH) in LTE according to an embodiment of the disclosure.

FIG. 2 is a view illustrating download physical channels, a PDCCH 201 and an enhanced PDCCH (EPDCCH) 202 where the LTE DCI is transmitted according to an embodiment of the disclosure.

Referring to FIG. 2, the PDCCH 201 is time-multiplexed with the PDSCH 203, which is a data transmission channel, and is transmitted over the overall system bandwidth. The region for the PDCCH 201 is represented with the number of OFDM symbols, and this is indicated to the UE via the control format indicator (CFI) that is transmitted via the physical control format indicator channel (PCFICH). The PDCCH 201 may be allocated to the OFDM symbols which are positioned in the head of the subframe, allowing the UE to decode the download scheduling allocation as quick as possible. This provides the advantage of being able to reduce the decoding latency for download shared channel (DL-SCH), i.e., the overall download transmission latency. Since one PDCCH carries one DCI message, and multiple UEs may simultaneously be scheduled for the download and uplink, multiple PDCCHs are simultaneously transmitted in each cell.

As a reference signal for decoding the PDCCH 201, the cell-specific reference signal (CRS) 204 is used. The CRS 204 is transmitted in each subframe over the entire band, and the scrambling and resource mapping are varied depending on the cell identity (ID). Since the CRS 204 is a reference signal commonly used for all the UEs, UE-specific beamforming cannot be used. Accordingly, the multi-antenna TX scheme for LTE PDCCH is limited to open-loop TX diversity. The number of CRS ports is implicitly known to the UE from the decoding of the physical broadcast channel (PBCH).

The resource allocation of the PDCCH 201 is based on the control-channel element (CCE), and one CCE is constituted of nine REGs, i.e., a total of 36 REs. The number of CCEs necessary for a particular PDCCH 201 may be 1, 2, 4, or 8, and this differs depending on the channel coding rate of the DCI message payload. As such, different numbers of CCEs are used to implement the link adaptation of the PDCCH 201.

The UE needs to detect a signal while it is unaware of the information about the PDCCH 201. LTE defines the search space that denotes a set of CCEs for blind decoding. The search space consists of a plurality of sets in the aggregation level (AL) of each CCE, and this is not explicitly signaled but is implicitly defined via the function and subframe number by the identity of the UE. In each subframe, the UE decodes the PDCCH 201 for all possible resource candidates that may be created from the CCEs in the set search space and processes the information declared by the CRC check to be valid for the UE.

The search space is divided into a UE-specific search space and a common search space. A predetermined group of UEs or all the UEs may investigate the common search space of the PDCCH 201 to receive cell-common control information, e.g., paging message, or dynamic scheduling for system information. For example, scheduling allocation information about DL-SCH for transmitting system information block (SIB)-1 containing, e.g., cell service provider information may be received by investigating the common search space of the PDCCH 201.

Referring to FIG. 2, the EPDCCH 202 is frequency-multiplexed with the PDSCH 203 and is transmitted. The BS may properly allocate the resources of the EPDCCH 202 and the PDSCH 203 via scheduling, thus able to effectively support coexistence with data transmission for existing LTE UEs. However, since the EPDCCH 202 is allocated and transmitted in one overall subframe on the time axis, there may be a loss in terms of transmission latency time. Multiple EPDCCHs 202 constitute one EPDCCH (202) set, and the EPDCCH (202) set is allocated per PRB pair. The location information about the EPDCCH set is set UE-specifically, and this is signaled via radio resource control (RRC). Up to two EPDCCHs sets may be set for each UE, and one EPDCCH set may simultaneously be multiplexed and set for different UEs.

The resource allocation of the EPDCCH 202 is performed based on the enhanced CCE (ECCE), and one ECCE may be constituted of four or eight enhanced REGs (EREGs), and the number of EREGs per ECCE may be varied depending on the CP length and subframe configuration information. One EREG consists of nine REs, and thus, there may be 16 EREGs per PRB pair. EPDCCH transmissions are divided into localized/distributed transmissions depending on the EREG RE mapping scheme. The ECCE aggregation level may be 1, 2, 4, 8, 16, or 32, and this is determined by the CP length, subframe configuration, EPDCCH format, or transmission scheme.

The EPDCCH 202 only supports the UE-specific search space. Accordingly, the UE, which desires to receive the system message, needs to investigate the common search space on the existing PDCCH 201.

Unlike the PDCCH 201, the EPDCCH 202 adopts the demodulation reference signal (DMRS) 205 as a reference signal for decoding. Thus, the precoding of the EPDCCH 202 may be set by the base station, and UE-specific beamforming may be used. The UEs may decode the EPDCCH 202 via the DMRS 205 even though they are unaware what precoding has been used. The EPDCCH 202 adopts the same pattern as the DMRS of the PDSCH 203. However, unlike the PDSCH 203, the DMRS 205 of the EPDCCH 202 is able to support transmission using up to four antenna ports. The DMRS 205 is transmitted only in the PRB where the EPDCCH is transmitted.

The port configuration information about the DMRS 205 is varied depending on the transmission scheme of the EPDCCH 202. In the case of localized transmission, the antenna port corresponding to the ECCE to which the EPDCCH 202 is mapped is selected based on the UE ID. Where different UEs share the same ECCE, i.e., when multi-user MIMO transmission is used, the DMRS antenna port may be allocated to each UE. Alternatively, the DMRS 205 may be shared and transmitted in which case it may be differentiated by the DMRS (205) scrambling set by higher layer signaling. In the case of distributed transmission, two DMRS (205) antenna ports are supported, and a precoder cycling type of diversity scheme is supported. The DMRS 205 may be shared for all the REs transmitted in one PRB pair.

Now described in greater detail is the search space for transmitting download control channels in LTE and LTE-A.

In LTE, the overall PDCCH region is constituted of a CCE set in the logical region, and there is a search space constituted of a set of CCEs. The search space is divided into the common search space and the UE-specific search space, and the search space for LTE PDCCH may be defined as follows.

Refer to Table 1 below in connection with this.

TABLE 1

The set of PDCCH candidates to monitor are defined in terms of search spaces, where a search space $S_k^{(L)}$ at aggregation level L ∈ {1,2,4,8} is defined by a set of PDCCH candidates. For each serving cell on which PDCCH is monitored, the CCEs corresponding to PDCCH candidate m of the search space $S_k^{(L)}$ are given by
$$L \{(Y_k + m') \bmod \lfloor N_{CCE,k} / L \rfloor\} + i$$
where $Y_k$ is defined below, i = 0,...,L−1 . For the common search space m' = m . For the PDCCH UE specific search space, for the serving cell on which PDCCH is monitored, if the monitoring UE is configured with carrier indicator field then m' = m + $M^{(L)}$ · $n_{CI}$ where $n_{CI}$ is the carrier indicator field value, else if the monitoring UE is not configured with carrier indicator field then m' = m , where m = 0,...,$M^{(L)}$ −1 . $M^{(L)}$ is the number of PDCCH candidates to monitor in the given search space.
Note that the carrier indicator field value is the same as ServCellIndex.
For the common search spaces, $Y_k$ is set to 0 for the two aggregation levels L = 4 and L = 8 .
For the UE-specific search space $S_k^{(L)}$ at aggregation level L , the variable $Y_k$ is defined by
$$Y_k = (A \cdot Y_{k-1}) \bmod D$$
where $Y_{-1} = n_{RNTI} \neq 0$ , A = 39827 , D = 65537 and k = $\lfloor n_s/2 \rfloor$ , $n_s$ is the slot number within a radio frame.
The RNTI value used for $n_{RNTI}$ is defined in subclause 7.1 in downlink and subclause 8 in uplink.

According to the definition of the search space for the PDCCH described above, the UE-specific search space is not explicitly signaled but is implicitly defined via the subframe number and function by the identity of the UE. In other words, the UE-specific search space may be varied depending on the subframe number, meaning that it may be varied depending on times. This addresses the problem that a particular UE among UEs cannot use the search space due to the other UEs (this issue is defined as 'blocking'.) Where a certain UE cannot be scheduled in a subframe because all the CCEs that it investigates are already in use by other UEs scheduled in the same subframe, such issue may not occur in the next subframe because the search space is varied over time. For example, although the UE-specific search spaces of UE #1 and UE #2 partially overlap each other in a particular subframe, the overlap may be predicted to differ in the next subframe because the UE-specific search space is varied per subframe.

According to the definition of the search space for the PDCCH described above, the common search space is defined as a set of CCEs previously agreed on because a predetermined group or UEs or all the UEs need to receive the PDCCH. In other words, the common search space does not vary depending on, e.g., the identity of the UE or subframe number. Although the common search space exists for transmission of various system messages, it may also be used to transmit the control information for individual UEs. Thus, the common search space may be used to address the UE's failure to be scheduled due to insufficient available resources in the UE-specific search space.

The search space is a set of candidate control channels constituted of CCEs that the UE needs to attempt to decode on the aggregation level, and since there are several aggregation levels to bundle up one, two, four, or eight CCEs, the UE has a plurality of search spaces. The number of PDCCH candidates that the UE needs to monitor in the search space defined as per the aggregation level in the LTE PDCCH may be defined as shown in Table 2 below.

TABLE 2

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, the UE-specific search space supports aggregation level {1, 2, 4, 8}, where it has {6, 6, 2, 2} PDCCH candidates, respectively. The common-specific search space supports aggregation level {4, 8}, where it has {4, 2}PDCCH candidates, respectively. The common search space only supports {4, 8} aggregation levels for making better the coverage property because the system message is generally required to reach the cell border.

The DCI transmitted in the common search space is defined only for particular DCI formats, e.g., 0/1A/3/3A/1C, which are ones for the power control purpose for the UE group or system message. In the common search space, the DCI formats having spatial multiplexing are not supported. The download DCI format that should be decoded in the UE-specific search space is varied depending on the transmission mode set for the UE. Since the transmission mode is set via RRC signaling, the exact subframe number as to whether the setting is effective for the UE is not designated. Accordingly, the UE may be operated not to lose communication by always performing decoding on DCI format 1A regardless of the transmission mode.

The download control channels in the 5G communication system are described below in detail with reference to FIGS. 3, 4, and 5.

Figure 3:
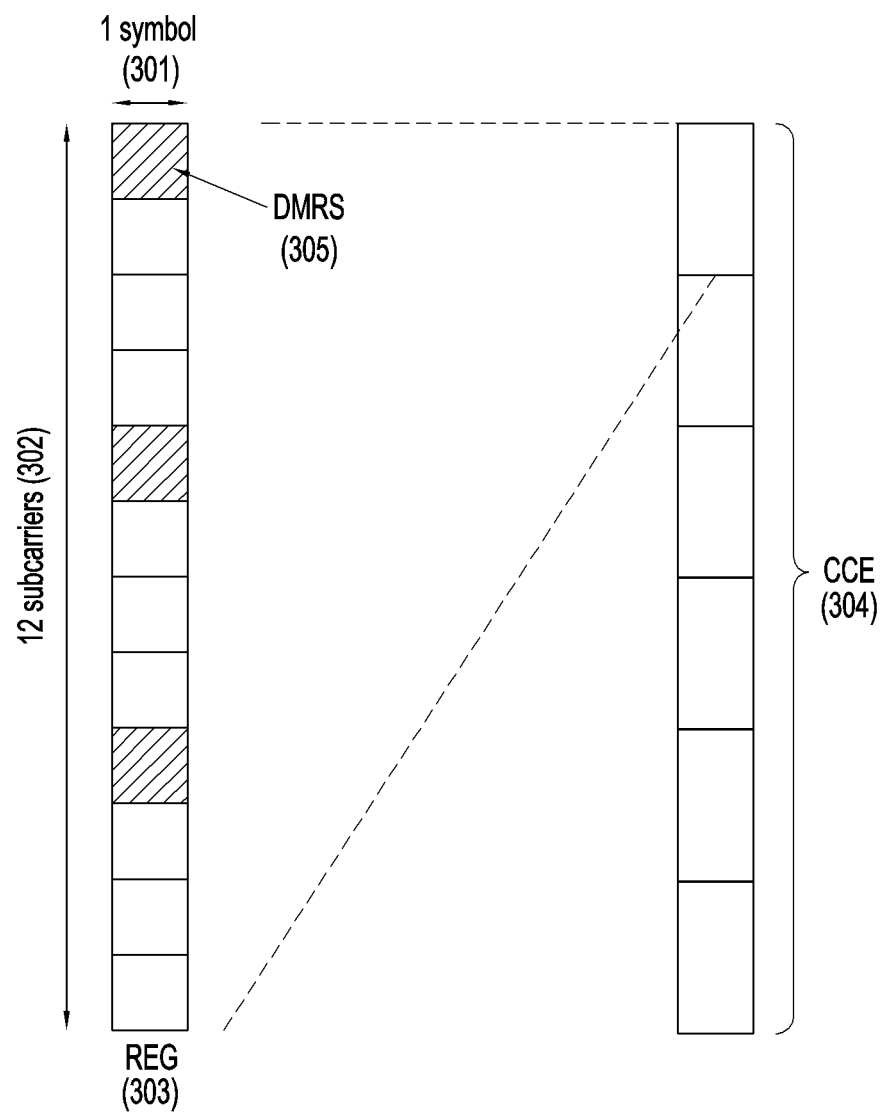
FIG. 3 is a view illustrating a transmission resource of a download control channel in a fifth generation (5G) communication system according to an embodiment of the disclosure.

FIG. 3 is a view illustrating an example of a basic unit of time and frequency resource constituting a download control channel available in 5G according to an embodiment of the disclosure.

Referring to FIG. 3, the basic unit (i.e., the resource element group (REG) of the time and frequency resource constituting the control channel includes one OFDM symbol 301 along the time axis and 12 subcarriers 302 along the frequency axis—i.e., one RB. By assuming one OFDM symbol 301 as the basic unit on the time axis in constituting the basic unit of the control channel, the data channel and the control channel may be time-multiplexed in one subframe. By leaving the control channel ahead of the data channel, the user's processing time may be reduced, making it easier to meet the latency time requirements. By setting the basic unit on the frequency axis for the control channel to one RB, frequency multiplexing between the control channel and the data channel may be carried out more efficiently.

Various sizes of control channel regions may be configured by joining REGs 303 as shown in FIG. 3. As an example, where the basic unit in which the download control channel is allocated in 5G is the CCE 304, one CCE 304 may consist of multiple REGs 303. For example, when the REG 303 of FIG. 3 may consist of 12 REs, and one CCE 304 consists of six REGs 303, the CCE 304 may consist of 72 REs. When the download control region is set, the region may be constituted of multiple CCEs 304, and a particular download control channel may be mapped to one or more CCEs 304 according to the aggregation level (AL) in the control region and be transmitted. The CCEs 304 in the control region may be distinguished with numbers in which case the numbers may be assigned according to a logical mapping scheme.

The basic unit, i.e., the REG 303, of the download control channel shown in FIG. 3 may contain REs to which the DCI is mapped and the region to which the DMRS 305, a reference signal for decoding the REs, is mapped. The DMRS 305 may be mapped and transmitted considering the number of antenna ports used to transmit the download control channel. Meanwhile, where two antenna ports (e.g., antenna port #0 and antenna port #1) are used as an example, the DMRS transmitted for antenna port #0 and the DMRS transmitted for antenna port #1 may exist. The DMRSs for the different antenna ports may be multiplexed in various manners. Further, the DMRSs corresponding to different antenna ports may be transmitted orthogonal to each other in different REs. As such, the DMRSs may be frequency division multiplexed (FDMed) and transmitted or may be code division multiplexed (CDMed) and transmitted. Other various types of DMRS patterns may exist, which may be associated with the number of antenna ports.

Figure 4:
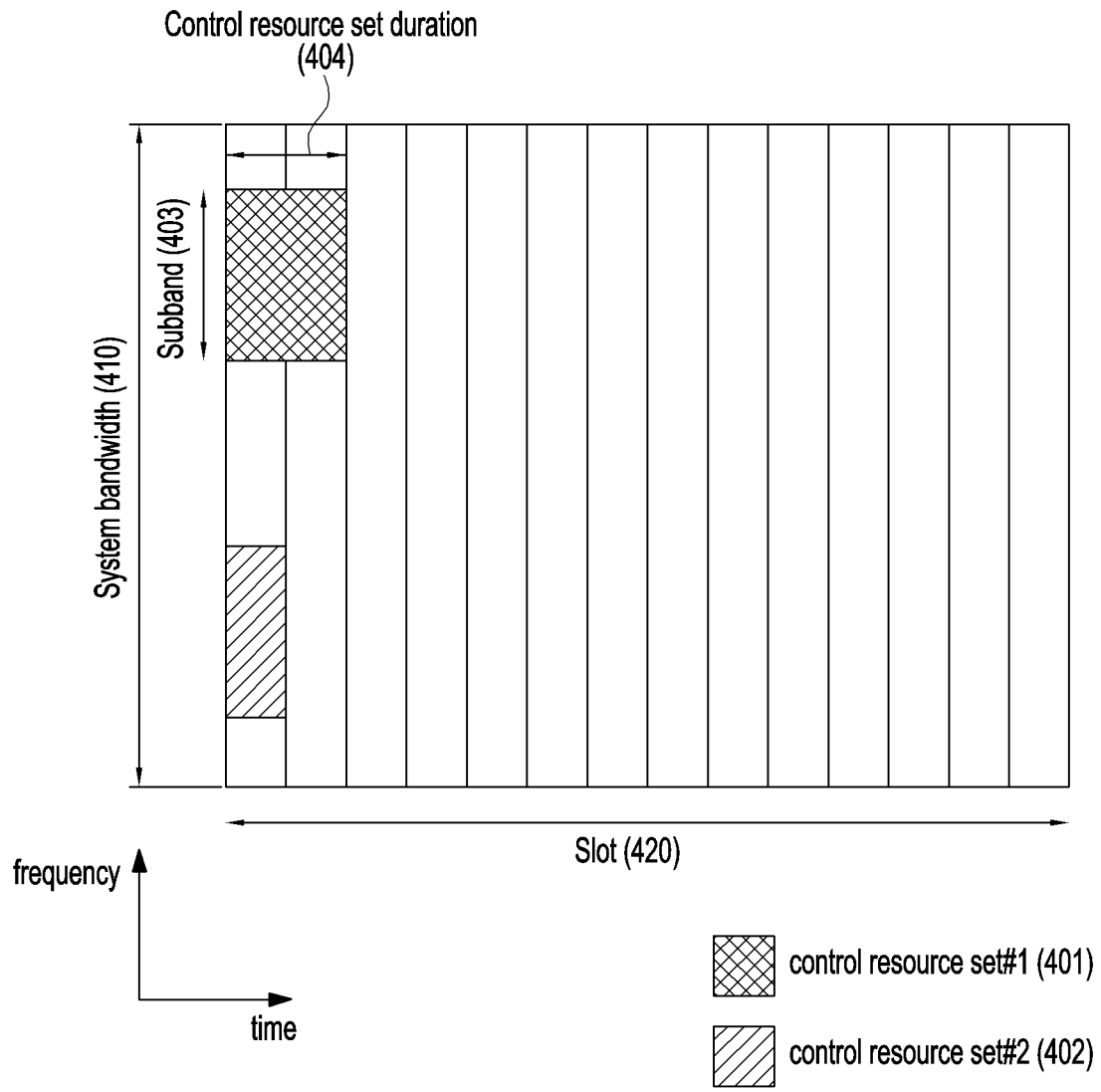
FIG. 4 is a view illustrating a download control region allocation in a 5G communication system according to an embodiment of the disclosure.

FIG. 4 is a view illustrating an example of a control region (control resource set (CORESET)) where the download control channel is transmitted in the 5G wireless communication system of the disclosure.

Referring to FIG. 4, an example in which two control regions (control resource set #1 401 and control resource set #2 402) are set in one slot 420 on the time axis while the system bandwidth 410 is set on the frequency axis. Although in the example illustrated in FIG. 4 one slot consists of seven OFDM symbols, this is merely an example for ease of description, and embodiments of the disclosure are not limited thereto. The control resource sets numbers 401 and 402 may be set to a particular subband 403 in the overall system bandwidth 410 on the frequency axis. One or more OFDM symbols may be set on the time axis, which may be defined as control resource set duration 404. FIG. 4 illustrates an example in which control resource set #1 401 is set to two-symbol control resource set duration, and control resource set #2 402 is set to one-symbol control resource set duration.

The above-described 5G control region may be set via higher layer signaling (e.g., system information or RRC signaling) from the BS to the UE. Setting a control region for a UE may mean that providing the UE with information such as the location of the control region, subband, resource allocation of the control region, and control resource set duration. For example, the information provided may contain at least one or more of pieces of information shown in Table 3 below.

TABLE 3

- configuration information 1. frequency-axis RB allocation information
- configuration information 2. control region start symbol
- configuration information 3. control resource set duration
- configuration information 4. REG bundling size
- configuration information 5. transmission mode (interleaved transmission scheme or non-interleaved transmission scheme)
- configuration information 6. search space type (common search space, group- common search space, UE-specific search space)
- configuration information 7. monitoring period
- others Besides the above-described configuration information, various pieces of information necessary to transmit the download control channel may be set for the UE.

A structure in which the sync signal and the PBCH are transmitted in the 5G communication system is described below.

Figure 5:
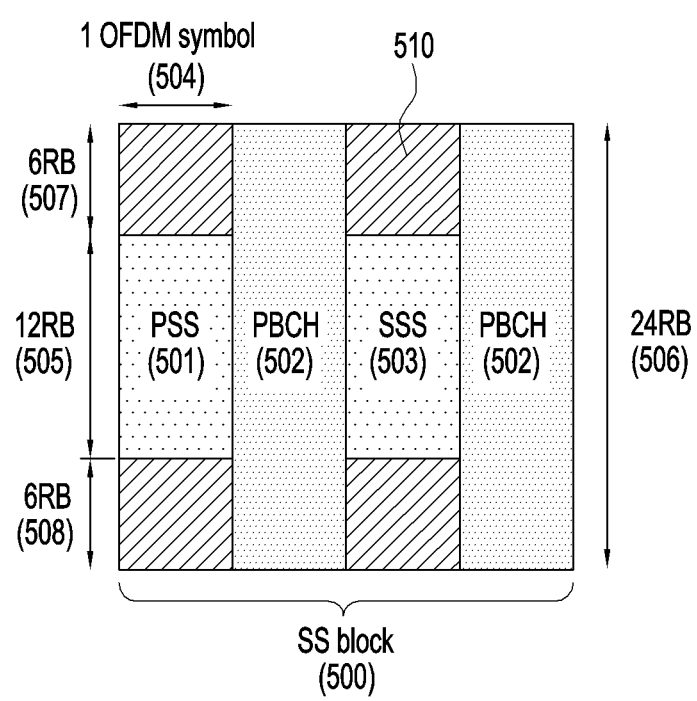
FIG. 5 is a view illustrating a sync signal block structure in a 5G communication system according to an embodiment of the disclosure.

FIG. 5 is a view illustrating a synchronization signal (SS) block 500 considered for 5G communication systems according to an embodiment of the disclosure.

Referring to FIG. 5, the synchronization signal block 500 includes a primary synchronization signal (PSS) 501, a secondary synchronization signal (SSS) 503, and a physical broadcast channel (PBCH) 502.

The PSS 501 and the SSS 503 may be transmitted in 12 RBs 505 on the frequency axis and in one OFDM symbol 504 on the time axis. In 5G, a total of 1,008 different cell IDs may be defined, the PSS 501 may have three different values depending on the physical layer ID of the cell, and the SSS 503 may have 336 different values. The UE may be aware of one of the 1,008 cell IDs in combination via detection of the PSS 501 and SSS 503. The cell ID may be represented in Equation 1 below.

$$N_{ID}^{cell}=3N_{ID}^{(1)}+N_{ID}^{(2)}$$ Equation 1

$N^{(1)}_{ID}$ may be estimated from the SSS 503, which has a value ranging from 0 to 335. $N^{(2)}_{ID}$ may be estimated from the PSS 501, which has a value ranging from 0 to 2. $N^{(1)}_{ID}$ By combining with $N^{(2)}_{ID}$, the cell ID, $N^{cell}_{ID}$, may be estimated. However, Equation 1 described above is merely an example method for estimating the cell ID, and the cell ID may also be estimated by other equations.

The PBCH 502 may be transmitted in 24 RBs 506 on the frequency axis and in two OFDM symbols 504 on the time axis. In the PBCH 502, various pieces of system information called MIB may be transmitted, and at least any one of the contents shown in Table 4 below may be transmitted.

TABLE 4

- (part of) SFN: [7-10] bits
  * at least 80ms granularity
- [H-SFN: 10 bits]
- timing information in radio frame: [0-7] bits
  * e.g., SS block time index: [0-6] bits
  * e.g., half radio frame timing: [0-1] bits
- remaining minimum system information (RMSI) scheduling information: [x] bits
  * control resource set(s) (CORESET(s)) information: [x] bits
  - simplified information of CORESET(s) configuration
  - [RMSI numerology: [0-2] bits]
  * frequency resource-related information for physical download shared channel (PDSCH) scheduling: [x] bits
  - bandwidth part-related information: [x] bits
  - information for quick identification that there is no corresponding RMSI to the PBCH: [0-1] bits
- [SS burst set periodicity: [0-3] bits]
- [area ID: x bits]
- [value tag: x bits]

TABLE 4-continued

- [information on tracking RS: x bits]
- reserved bits: [x>0] bits

As set forth above, the synchronization signal block 500 consists of the PSS 501, the SSS 503, and the PBCH 502 and may be mapped with a total of four OFDM symbols on the time axis. Since the transmission bandwidth (12 RBs 505) for the PSS 501 and the SSS 503 differs from the transmission bandwidth (24 RBs 506) for the PBCH 502, the OFDM symbols where the PSS 501 and the SSS 503 are transmitted in the PBCH (502) transmitted band (24 RBs 506) may have 6 RBs (e.g., 507 and 508 of FIG. 5) on both sides except for the 12 RBs in the middle where the PSS 501 and the SSS 503 are transmitted, and the resource blocks 507 and 508 in FIG. 5 may be used for transmitting other signals or may be empty. Reference number 510 represents an example of an OFDM symbol that can be associated with the 6 RBs 507.

According to the disclosure, there is proposed a method for transmitting a distributed or interleaved download control channel, i.e., PDCCH, in the 5G wireless communication system.

According to the disclosure, 5G wireless communication systems support methods for transmitting download control channels, particularly distributed or interleaving transmission methods and localized or non-interleaving transmission methods. Distributed transmission methods may adopt interleaver or distributed mapping to maximize frequency-axis diversity. The resource distribution for a particular download control channel may be carried out in REG bundle size. At this time, one or more control resource sets (CORESETs) may be set in the system bandwidth, and control regions set with different system parameters may be configured to overlap on the same time/frequency resource. In this case, the control channel distribution method of one control region in the overlapping region may influence the transmission of the download control channel in another control region. For example, where two different control regions with different REG bundle sizes wholly or partially overlap each other in the time/frequency resource, the blocking probability between the two control regions may increase depending on the interleaving or resource distribution scheme. The blocking probability may mean the probability of failing to transmit a PDCCH candidate as another PDCCH candidate is transmitted. Thus, a need exists for designing an interleaver capable of effectively obtaining diversity while reducing the blocking probability. According to the disclosure, there are proposed, as methods for transmitting a distributed download control channel, a method for performing interleaving in some RB sets constituting the control region, a method for performing interleaving at particular RB intervals, and a method for performing interleaving with an offset set to each control region. Also proposed are interleaving parameters capable of randomizing various types of interference.

Minimizing power consumption due to the UE's blind decoding is very critical in designing the search space of the 5G download control channel. To that end, upon blind decoding each control channel candidate, it may be considered to reuse the channel estimation value used for prior decoding. For that purpose, the search space may be designed so that a higher aggregation level of search space is constituted of a set of lower aggregation levels, for example. Such search space structure may be called a nested structure. According to the disclosure, there is proposed designing a search space considering the nested structure.

According to the disclosure, the whole search space may be constituted of multiple partial search spaces, and each partial search space may be constituted of the same number of PDCCH candidates. In other words, each partial search space may be configured in the same form as possible. According to the disclosure, the proposed structure may ensure an even performance for each partial search space when adjusting the number of times of blind decoding with a scaling factor.

The DMRS may be transmitted for decoding the 5G download control channel. A sequence available for the DMRS should be agreed on between the BS and the UE. In an example method therefor, a pre-defined unique identity (ID), e.g., cell ID or UE ID (e.g., RNTI) may be used, or the value may be set for each UE via higher layer signaling (e.g., RRC signaling). According to the disclosure, there is provided a method for determining the DMRS sequence of the download control channel given the beam operation considered in the 5G communication system. According to the disclosure, the proposed method may effectively randomize inter-beam interference or inter-TRP interference.

Hereinafter, embodiments of the disclosure are described in detail with reference to the accompanying drawings. Further, although LTE or LTE-A system is described in connection with embodiments of the disclosure, as an example, embodiments of the disclosure may also apply to other communication systems with similar technical background or channel form. For example, embodiments of the disclosure may also be applicable to post-LTE-A, 5G mobile communication technology (e.g., new radio (NR)). Further, embodiments of the disclosure may be modified in such a range as not to significantly depart from the scope of the disclosure under the determination by one of ordinary skill in the art and such modifications may be applicable to other communication systems.

First Embodiment

According to a first embodiment of the disclosure, there is proposed an interleaving method (or a method for evenly distributing resources) for the distributed PDCCH.

As set forth above, the minimum transmission unit for the PDCCH in 5G is the control channel element (CCE), and one CCE may consist of a total of six REGs. To raise channel estimation capability, multiple REGs may constitute one REG bundle, and resources may be allocated so that the REGs constituting one REG bundle are positioned adjacent each other in the time and frequency resources. That is, the REG bundle may be localized. In the distributed PDCCH, one CCE may be mapped to be distributed in REG bundle units in the time and frequency resources in the control region, which may be carried out by a particular interleaver function (or distribution mapping method). At this time, the minimum unit of the interleaving may be the REG bundle. For example, the resources of the overall control region may be indexed in REG bundle units and may be entered as inputs to the interleaver function, and the outputs of the interleaver function may be interleaved REG bundle indexes. This may be summarized and represented as shown in Table 5 below.

TABLE 5

The CCE-to-REG mapping for a control-resource set can be interleaved or non-interleaved, configured by the higher-layer parameter CORESET_Trans_type, and is described by REG bundles,
- REG bundle i is defined as REGs $\{i, iL+1, ..., iL+L-1\}$ where $L \in \{2,6\}$ is the REG bundle size configured by the higher-layer parameter CORESET_REG_bundle_size and $i=0,1,...,N_{REG}^{CORESET}/L-1$ is the number of REGs in the CORESET
- CCE j consists of REG bundles $\{f(6j/L), f(6j/L+1), ..., f(6j/L+6/L-1)\}$ where $f(x)$ is an interleaver
For interleaved CCE-to-REG mapping, $L \in \{2,6\}$ for $N_{symb}^{CORESET}=1$ and $L \in \{N_{symb}^{CORESET}, 6\}$ for $N_{symb}^{CORESET} \in \{2,3\}$ For example, the interleaver function may follow the methods below (e.g., interleaving method 1 and interleaving method 2).

[Interleaving Method 1]

The input to the block interleaver may be the REG bundle. An interleaving matrix may be generated, and the indexes may be selected and output in the order of the rows in the interleaving matrix.

Meanwhile, interleaving method 1 may be expressed in Tables 6 and 7 below.

TABLE 6

The input to the block interleaver are REG bundle indices denoted by $d_1, d_2, ..., d_D$, where D is the number of REG bundle indices. The output index sequence from the block interleaver is derived as follows,
(1) Assign $C_{subblock}^{CC} = 32$ to be the number of columns of the matrix. The columns of the matrix are numbered $0, 1, 2, ..., C_{subblock}^{CC} - 1$ from left to right.
(2) Determine the number of rows of the matrix $R_{subblock}^{CC}$, by finding minimum integer $R_{subblock}^{CC}$ such that,
$D \leq (R_{subblock}^{CC} \times C_{subblock}^{CC})$
The rows of rectangular matrix are numbered $0, 1, 2, ..., R_{subblock}^{CC} - 1$ from top to bottom.
(3) If $(R_{subblock}^{CC} \times C_{subblock}^{CC}) > D$, then $N_D = (R_{subblock}^{CC} \times C_{subblock}^{CC} - D)$ dummy indices are padded such that $y_k = $ <NULL> for $k = 0, 1, ..., N_D - 1$. Then, $y_{N_D+k} = d_k^{(i)}$, $k = 0, 1, ..., D-1$, and the index sequence $y_k$ is written into the $(R_{subblock}^{CC} \times C_{subblock}^{CC})$ matrix row by row starting with bit $y_0$ in column 0 of row 0, $$\begin{bmatrix} y_0 & y_1 & y_2 & \cdots & y_{C_{subblock}^{CC}-1} \\ y_{C_{subblock}^{CC}} & y_{C_{subblock}^{CC}+1} & y_{C_{subblock}^{CC}+2} & \cdots & y_{2C_{subblock}^{CC}-1} \\ \vdots & \vdots & \vdots & \ddots & \vdots \\ y_{(R_{subblock}^{CC}-1) \times C_{subblock}^{CC}} & y_{(R_{subblock}^{CC}-1) \times C_{subblock}^{CC}+1} & y_{(R_{subblock}^{CC}-1) \times C_{subblock}^{CC}+2} & \cdots & y_{(R_{subblock}^{CC} \times C_{subblock}^{CC}-1)} \end{bmatrix}$$

(4) Perform the inter-column permutation for the matrix based on the pattern $\langle P(j) \rangle_{j \in \{0,1,...,C_{subblock}^{CC}-1\}}$ that is shown in table below, where $P(j)$ is the original column position of the j-th permuted column. After permutation of the columns, the inter-column permuted $(R_{subblock}^{CC} \times C_{subblock}^{CC})$ matrix is equal to TABLE 6-continued $$\begin{bmatrix} y_{P(0)} & y_{P(1)} & y_{P(2)} & \cdots & y_{P(C_{subblock}^{CC}-1)} \\ y_{P(0)+C_{subblock}^{CC}} & y_{P(1)+C_{subblock}^{CC}} & y_{P(2)+C_{subblock}^{CC}} & \cdots & y_{P(C_{subblock}^{CC}-1)+C_{subblock}^{CC}} \\ \vdots & \vdots & \vdots & \ddots & \vdots \\ y_{P(0)+(R_{subblock}^{CC}-1)\times C_{subblock}^{CC}} & y_{P(1)+(R_{subblock}^{CC}-1)\times C_{subblock}^{CC}} & y_{P(2)+(R_{subblock}^{CC}-1)\times C_{subblock}^{CC}} & \cdots & y_{P(C_{subblock}^{CC}-1)+(R_{subblock}^{CC}-1)\times C_{subblock}^{CC}} \end{bmatrix}$$

(5) The output of the block interleaver is the index sequence read out column by column from the inter-column permuted $(R_{subblock}^{CC} \times C_{subblock}^{CC})$ matrix. The indices after sub-block interleaving are denoted by $v_0^{(i)}, v_1^{(i)}, v_2^{(i)}, \ldots, v_{K_\Pi-1}^{(i)}$, where $v_0^{(i)}$ corresponds to $y_{P(0)}, v_1^{(i)}$ to $y_{P(0)+C_{subblock}}^{CC} \ldots$ and $K_\Pi = (R_{subblock}^{CC} \times C_{subblock}^{CC})$

TABLE 7

Inter-column permutation pattern for sub-block interleaver.

| Number of columns $C_{subblock}^{CC}$ | Inter-column permutation pattern <P(0), P(1), ..., P($C_{subblock}^{CC}$ − 1)> |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> |

[Interleaving Method 2]

Input value: REG bundle index sequence={d(n), n=0, 1, 2, ..., $N_{REGb}$−1}.

In the foregoing, $N_{REGb}$ may correspond to the total number of REG bundles in the control region, and d(n) may correspond to the nth REG bundle index.

Interleaving matrix generation: generates a matrix of C×C' size as follows.

$$\begin{bmatrix} d(0) & d(1) & d(2) & \cdots & d(C-1) \\ d(C) & d(C+1) & d(C+2) & \cdots & d(2C-1) \\ \vdots & \vdots & \vdots & \ddots & \vdots \\ d(C\times(C'-1)) & d(C\times(C'-1)) & d(C\times(C'-1)+1) & \cdots & d(N_{REGb}-1) \end{bmatrix}$$

Output value: the indexes may be selected and output in the order of the rows in the interleaving matrix.

Meanwhile, in the foregoing, C=$N_{CCE\_REGb}$, i.e., the number of REB bundles per CCE, and C'=$N_{CCE}$, the total number of CCEs in the control region.

The interleaving scheme may be designed given the circumstance where different control regions overlap. For example, the BS may be configured so that control region #1 and control region #2 overlap in a particular time and frequency resource. In this case, PDCCH candidate #1 which may be transmitted in control region #1 may overlap PDCCH candidate #2 which may be transmitted in control region #2. Thus, upon transmitting PDCCH candidate #1, PDCCH candidate #2 may not be transmitted (this may be called 'blocking'). The blocking probability may increase as control regions with different pieces of configuration information overlap. For example, in the following cases, the blocking probability may further increase. In other words, where control regions with different symbol lengths overlap each other, where control regions configured with different REG bundle sizes overlap each other, or where control regions configured with different transmission methods (e.g., distributed or localized) overlap each other, the blocking probability may further increase.

Accordingly, interleaving needs to be designed to minimize the blocking probability given the above cases. Described below are interleaving methods according to embodiments of the disclosure.

Embodiment 1-1

According to embodiment 1-1 of the disclosure, there is provided a method for performing interleaving on the distributed PDCCH, in which all the REG bundles may be divided in particular groups, and interleaving on the REG bundles may be performed in each REG bundle group.

Figure 6:
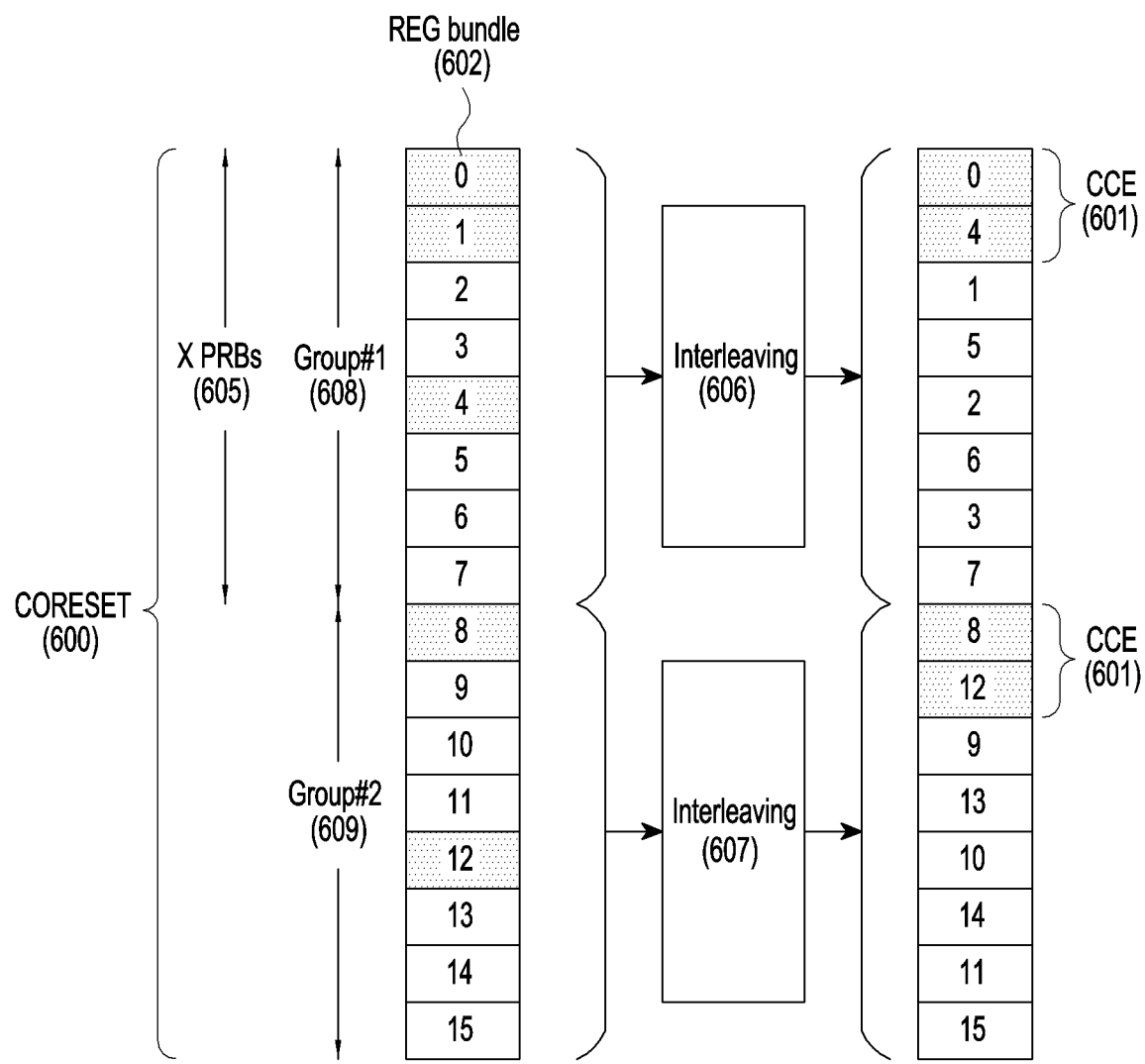
FIG. 6 is a view illustrating an interleaving scheme according to embodiment 1-1 of the disclosure.

FIG. 6 is a view illustrating an interleaving scheme according to embodiment 1-1 of the disclosure.

Referring to FIG. 6, one control region 600 (e.g., a CORESET) as an example, in which the control region 600 may include a total of eight CCEs 601. One CCE 601 may consist of one or more REG bundles 602. FIG. 6 illustrates an example in which the CCE 601 consists of two REG bundles 602. Alternatively, the CCE 601 may include three or more REG bundles 602. Meanwhile, FIG. 6 illustrates a scenario case where the overall control region 600 consists of a total of 16 REG bundles 602.

The M REG bundles 602 in the control region 600 may be divided into N (≥1) groups, and each group may consist of M/N REG bundles 602. FIG. 6 illustrates an example in which all the REG bundles 602 are divided into two groups, e.g., group #1 608 and group #2 609. Each REG bundle group may include a total of eight REG group bundles 602. Reference number 605 represents an example of X PRBs that can be associated with the group #1 608.

The BS may set the size or number of REG bundle groups for the UE. The BS may also set the number of RBs to perform grouping for the UE. For example, the BS may set X RBs, which are resources in the frequency region to perform grouping as shown in FIG. 6.

The BS may notify the UE of the settings related to the REG bundle group via higher layer signaling (e.g., RRC signaling). Or, the number of REG bundle groups may be implicitly determined with different system parameters. For example, it may be determined by a function for the total number of REG bundles in the control region.

Or, the number of REG bundle groups may be fixed with the system parameter.

In the method for determining the REG bundle group, the REGs constituting one REG bundle group may be a set of the REGs present in the X RBs in the control region. At this time, X may be an integer multiple of 6 RBs. Where X is an integer multiple of 6, if the control region with a REG bundle size of 6 REGs or the control region set in the localized transmission scheme overlaps the control region with a different setting, it may assist in minimizing the blocking probability.

Interleaving may be performed in the REG bundle group. For example, referring to FIG. 6, interleaving 606 may be performed on REG bundle group #1 608, and interleaving 607 may be performed on REG bundle group #2 609. As the interleaving scheme, the above-described interleaving method 1 and interleaving method 2 may be used. In this case, the input value for the interleaving may, rather than the set of all the REG indexes in the overall control region, be a set of the REG bundle indexes present in a particular REG bundle group in the control region. A specific example of embodiment 1-1 of the disclosure is described in detail with reference to interleaving method 2.

[Interleaving Method 3]

Input value: REG bundle index sequence={d(n), n=0, 1, 2, . . . , $N_{REGb}/N-1$}.

In the foregoing, $N_{REGb}$ may correspond to the total number of REG bundles in the control region, N may correspond to the number of REG bundle groups, and d(n) may correspond to the nth REG bundle index in the REG bundle group.

Interleaving matrix generation: generates a matrix of C×C' size as follows.

$$\begin{bmatrix} d(0) & d(1) & d(2) & \cdots & d(C-1) \\ d(C) & d(C+1) & d(C+2) & \cdots & d(2C-1) \\ \vdots & \vdots & \vdots & \ddots & \vdots \\ d(C\times(C'-1)) & d(C\times(C'-1)) & d(C\times(C'-1)+1) & \cdots & d(N_{REGb}) \end{bmatrix}$$

In the above example, $C=N_{CCE\_REGb}$, i.e., the number of REG bundles per CCE. In the above example, $=N_{CCE}$, may correspond to the total number of the CCEs in the REG bundle group.

Output value: the indexes may be selected and output in the order of the rows in the interleaving matrix.

As described above, one CCE may be constituted of the REG bundle index set after interleaving. That is, CCE j may be constituted of the REG bundle (f(6j/L), f(6j/L+1), . . . , f(6j/L+6/L−1)), and f(•) may correspond to the interleaver function.

Meanwhile, the BS may provide the UE with the configuration information (e.g., X or the number of REG bundle groups) related to the above-described interleaving via higher layer signaling, e.g., RRC signaling. After receiving the REG bundle group-related configuration information from the base station, the UE may appreciate the interleaving scheme of the control region according to the setting and may blind-decode the download control region in the control region after assuming the interleaving scheme.

Embodiment 1-2

According to embodiment 1-2 of the disclosure, there is provided a method for performing interleaving on the distributed PDCCH, in which the REG bundles constituting one CCE may be interleaved at as constant intervals as possible, e.g., at intervals of Y. Here, Y may be set for the UE by the BS or may be defined as a value fixed in the system parameter. Where Y is set, the Y value may be provided from the BS to the UE via higher layer signaling, e.g., RRC signaling.

Figure 7:
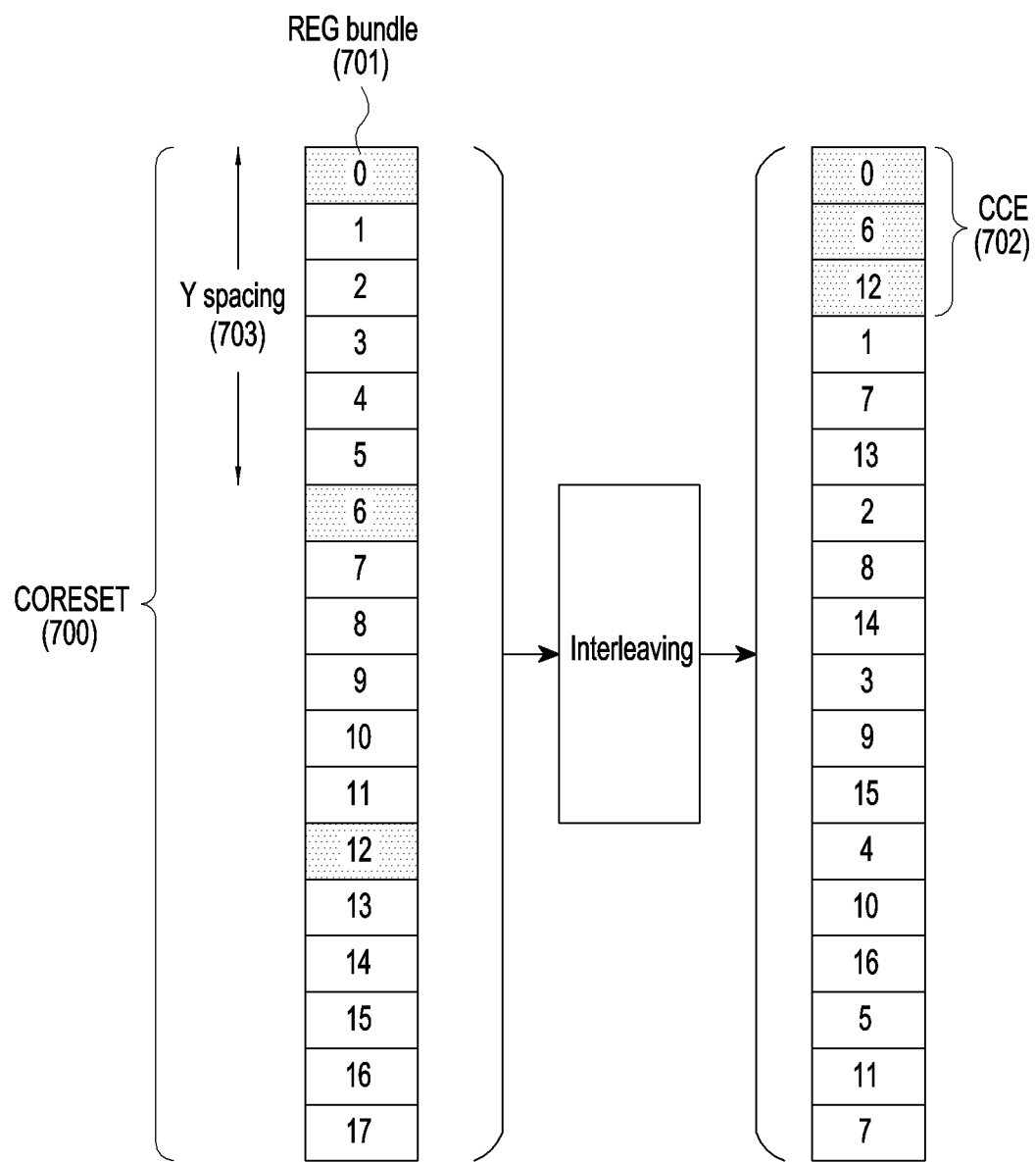
FIG. 7 is a view illustrating an interleaving scheme according to embodiment 1-2 of the disclosure.

FIG. 7 is a view illustrating an interleaving scheme according to embodiment 1-2 of the disclosure.

Referring to FIG. 7, the control region 700 (e.g., a CORESET) includes a total of 18 REG bundles 701, and one CCE 702 consists of three REG bundles 701, for example. In this case, interleaving may be performed so that the three REG bundles 701 constituting the CCE 702 are distributed at constant intervals (e.g., intervals of Y 703) on the frequency axis. For example, in the example of FIG. 7, Y=6, and thus, REG bundles {0, 6, 12} (701) may constitute one CCE 702. Where Y=4, REG bundles {0, 4, 8} may constitute one CCE.

In determining Y, Y may be an integer multiple of 6. Where Y is an integer multiple of 6, if the control region with a REG bundle size of 6 REGs or the control region set in the localized transmission scheme overlaps the control region with a different setting, it may assist in minimizing the blocking probability. A specific example of embodiment 1-2 of the disclosure is described in detail with reference to interleaving method 2.

[Interleaving Method 4]

Input value: REG bundle index sequence={d(n), n=0, 1, 2, . . . , $N_{REGb}-1$}.

$N_{REG}b$ may correspond to the total number of the REG bundles in the control region. d(n) may correspond to the nth REG bundle index.

Interleaving matrix generation: generates a matrix of C×C' size as follows.

$$\begin{bmatrix} d(0) & d(1) & d(2) & \cdots & d(C-1) \\ d(C) & d(C+1) & d(C+2) & \cdots & d(2C-1) \\ \vdots & \vdots & \vdots & \ddots & \vdots \\ d(C\times(C'-1)) & d(C\times(C'-1)) & d(C\times(C'-1)+1) & \cdots & d(C\times C'-1) \end{bmatrix}$$

C' may be a value settable by the BS or may correspond to a value fixed in the system parameter. In the above example, it may be a value corresponding to C=ceil($N_{REGb}$/C'). ceil(x) is the function to output the smallest integer among x or larger numbers. Where C×C'>$N_{REGb}$, d($N_{REGb}$), d($N_{REGb}$+1), . . . , d(C×C'−1) may be filled with <NULL>.

Output value: the indexes may be selected and output in the order of the rows in the interleaving matrix.

<NULL> may be excluded from the outputs.

As described above, one CCE may be constituted of the REG bundle index set after interleaving. That is, CCE j may be constituted of the REG bundle f(6j/L), f(6j/L+1), . . . , f(6j/L+6/L−1), and f(•) may correspond to the interleaver function.

Meanwhile, the BS may provide the UE with the configuration information (e.g., Y) related to the above-described interleaving via higher layer signaling, e.g., RRC signaling. After receiving the interleaving-related configuration information from the base station, the UE may appreciate the interleaving scheme of the control region according to the setting and may blind-decode the download control region in the control region after assuming the interleaving scheme.

Embodiment 1-3

According to embodiment 1-3 of the disclosure, there is provided a method for performing interleaving on the distributed PDCCH, in which after interleaving, an offset of a particular size (e.g., Z) may be additionally applied.

Figure 8:
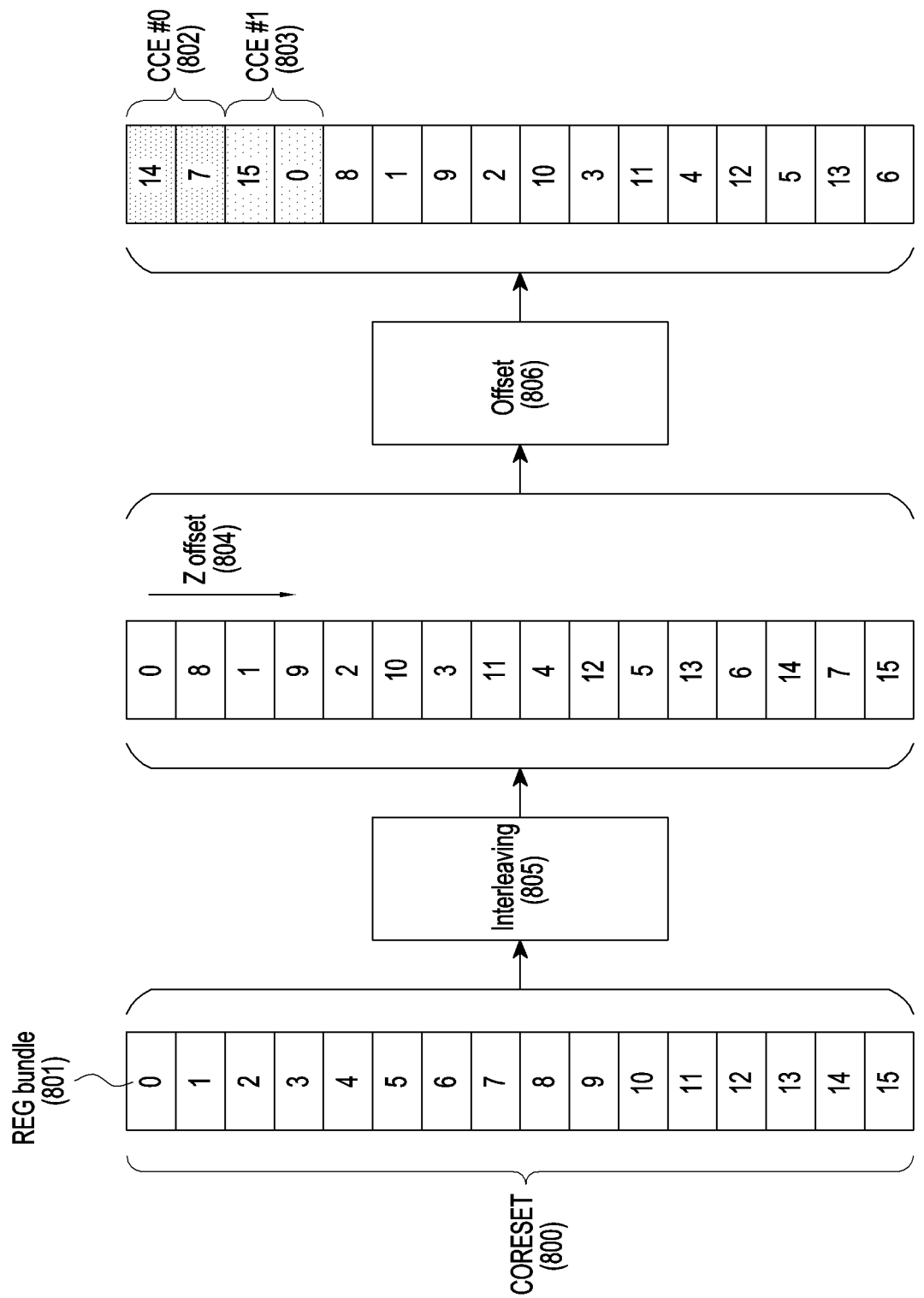
FIG. 8 is a view illustrating an interleaving scheme according to embodiment 1-3 of the disclosure.

FIG. 8 is a view illustrating an interleaving scheme according to embodiment 1-3 of the disclosure.

Referring to FIG. 8, the overall control region 800 (e.g., a CORESET) includes a total of 18 REG bundles 801, and each of CCE #0 (802) and CCE #1 (803) consists of two REG bundles 801, for example. The REG bundle (801) index may be input to the interleaving (805) function, and after interleaving, may be output. The output REG bundle index, after interleaving, may be input to the offset (806) function, and may be index-offset by a particular value and then output. Here, the offset value Z (804) may be set in various manners. Offsetting may follow, e.g., Equation 2 below.

$$d''(n)=d'(n)+Z \bmod N_{REGb} \quad \text{Equation 2}$$

In Equation 2 above, d'(n) may correspond to the nth REG bundle index after interleaving, d"(n) may correspond to the nth REG bundle index after being offset, Z may correspond to the offset value, and $N_{REGb}$ may correspond to the total number of the REG bundles in the control region. In Equation 2 above, "X mod Y" is the operator to output the remainder after X is divided by Y.

Here, Z may be set for the UE by the BS or may be defined as a value fixed in the system parameter. Where Z is set, the Z value may be provided from the BS to the UE via higher layer signaling, e.g., RRC signaling.

As described above, one CCE may be constituted of the REG bundle index set after interleaving. That is, CCE J may be constituted of the REG bundle (f(6j/L), f(6j/L+1), ... f(6/L+6/L−1), and f(•) may correspond to the interleaver function considering both the interleaver function and the offset function.

According to embodiment 1-3 of the disclosure, where the control regions configured with different REG bundle sizes overlap each other via the offset value Z, such a control may be performed that only particular PDCCH candidates cause blocking. The BS may set, for the UE, the offset value Z to minimize the blocking probability based on the circumstance where the control regions overlap.

One or more operations among embodiments 1-1, 1-2, and 1-3 described above may be operated in combination.

Meanwhile, the BS may provide the UE with the configuration information (e.g., Z) related to the above-described interleaving via higher layer signaling, e.g., RRC signaling. After receiving the interleaving-related configuration information from the base station, the UE may appreciate the interleaving scheme of the control region according to the setting and may blind-decode the download control region in the control region after assuming the interleaving scheme.

Embodiment 1-4

According to embodiment 1-4 of the disclosure, there is proposed a method for randomizing interference (e.g., inter-cell interference, inter-TRP interference, or inter-beam interference) among methods for performing interleaving on the distributed PDCCH.

The REG bundle index input to the interleaver function may follow the method below.

Input value (d') offset REG bundle index sequence, i.e., {d'(n), n=0, 1, 2, ..., $N_{REGb}$}.

In the foregoing, d'(n)=d(n)+W mod $N_{REGb}$. $N_{REGb}$ may correspond to the total number of the REG bundles in the control region. d(n) may correspond to the REG bundle index after offsetting.

In the foregoing, the offset value W may correspond to one of the cell ID, TRP ID, synchronization signal block index, component carrier index, or bandwidth part index.

Or, the offset value W may correspond to a value expressed by one or more functions among the cell ID, TRP ID, synchronization signal block index, component carrier index, and bandwidth part index. For example, it may be constituted of a combination of the cell ID and the synchronization signal block index, e.g., W=cell ID+synchronization signal block index.

The offset value W may be set for the UE by the BS via higher layer signaling (e.g., RRC signaling).

Meanwhile, the BS may provide the UE with the configuration information (e.g., W) related to the above-described interleaving via higher layer signaling, e.g., RRC signaling. After receiving the interleaving-related configuration information from the base station, the UE may appreciate the interleaving scheme of the control region according to the setting and may blind-decode the download control region in the control region after assuming the interleaving scheme.

Embodiment 1-5

According to embodiment 1-5 of the disclosure, there is provided a method for performing interleaving on the distributed PDCCH, in which the BS may set, for the UE, whether to perform additional randomization (or permutation) on the column components of the interleaving matrix (or whether to perform inter-column permutation, refer to Tables 6 and 7). The configuration information may be set for the UE by the BS via higher layer signaling (e.g., RRC signaling). As an example, it may be included as part of the configuration parameters of the control region and be indicated to the UE.

A specific example of embodiment 1-5 of the disclosure is described in detail with reference to interleaving method 4.

[Interleaving Method 5]

Input value: REG bundle index sequence={d(n), n=0, 1, 2, ..., $N_{REGb}$−1}, $N_{REGb}$ may correspond to the total number of the REG bundles in the control region. d(n) may correspond to the nth REG bundle index.

Interleaving matrix generation: generates a matrix of C×C' size as follows.

$$\begin{bmatrix} d(P(0)) & d(P(1)) & d(P(2)) & \cdots & d(P(C'-1)) \\ d(P(0)+C') & d(P(1)+C') & d(P(2)+C') & \cdots & d(P(C'-1)+C') \\ \vdots & \vdots & \vdots & \ddots & \vdots \\ d(P(0)+C'\times(C'-1)) & d(P(1)+C'\times(C'-1)) & d(P(2)+C'\times(C'-1)) & \cdots & d(P(C'+1)+C'\times(C'-1)) \end{bmatrix}$$

C' may be a value settable by the BS or may correspond to a value fixed in the system parameter. In the foregoing, C=ceil($N_{REGb}$/C'). ceil(x) is the function to output the smallest integer among x or larger numbers. Where C×C'>$N_{REGb}$, d($N_{REGb}$), d($N_{REGb}$+1), ..., d(C×C'−1) may be filled with <NULL>.

Here, P(•) is any interleaver function.

Where such a setting is made as to perform additional permutation on the column components of the interleaving matrix, it may be any interleaver function that meets P(j)=k. Where C'=32, i.e., the output values for P(0), P(1), ... P(31) may be as follows as an example. Alternatively, the output values may have different patterns or values.

<1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>

The interleaver function P(•) may be defined as a function of system parameters, and it may have the property of being randomized by a function induced by the cell ID or RNTI.

Where the setting is made to perform no additional permutation on the column components of the interleaving matrix, the interleaver function may be defined as P(j)=j.

Output value: the indexes may be selected and output in the order of the rows in the interleaving matrix.

<NULL> may be excluded from the outputs.

Meanwhile, the BS may provide the UE with the configuration information (e.g., whether to perform inter-column permutation) related to the above-described interleaving via higher layer signaling, e.g., RRC signaling. After receiving the interleaving-related configuration information from the base station, the UE may appreciate the interleaving scheme of the control region according to the setting and may blind-decode the download control region in the control region after assuming the interleaving scheme.

In the first embodiment of the disclosure, the interleaving method assumes the block interleaver and that, after a particular sequence is input in the order of the rows of the block interleaver, the output is made in the order of the columns. The same method may be performed in the column-row order. For example, after the inputs are made in the order of columns, the outputs may be made in the order of rows. In this case, the parameters for the rows may be replaced with the parameters for the columns, and the parameters for the columns may be replaced with the parameters for the rows. The operations may be interpreted in the same manner.

Second Embodiment

According to the second embodiment of the disclosure, a search space for the 5G download control channel is proposed. Minimizing power consumption due to the UE's blind decoding is very critical in designing the search space of the 5G download control channel. To that end, upon blind decoding each control channel candidate, it may be considered to reuse the channel estimation value used for prior decoding. For that purpose, the search space may be designed so that a higher aggregation level of search space is constituted of a set of lower aggregation levels, for example. Such search space structure may be called a nested structure.

According to the disclosure, there is proposed designing a search space considering the nested structure. According to the disclosure, the whole search space may be constituted of multiple partial search spaces, and each partial search space may meet the above-described nested structure. Each partial search space may be constituted of the same number (or similar numbers, as possible) of PDCCH candidates.

The structure proposed herein may ensure the nested structure in each partial search space, guaranteeing reduced power consumption in the UE upon blind decoding. The proposed structure may ensure an even performance for each partial search space when adjusting the number of times of blind decoding with a scaling factor. Adjusting the number of times of blind decoding with the scaling factor may correspond to the operation of, when the number of the PDCCH candidates constituting the whole search space is X, setting or indicating scaling factor $\alpha$ ($0 \leq \alpha \leq 1$), thereby monitoring the search space constituted of the PDCCH candidate corresponding to Y=$\alpha \cdot$X.

Figure 9:
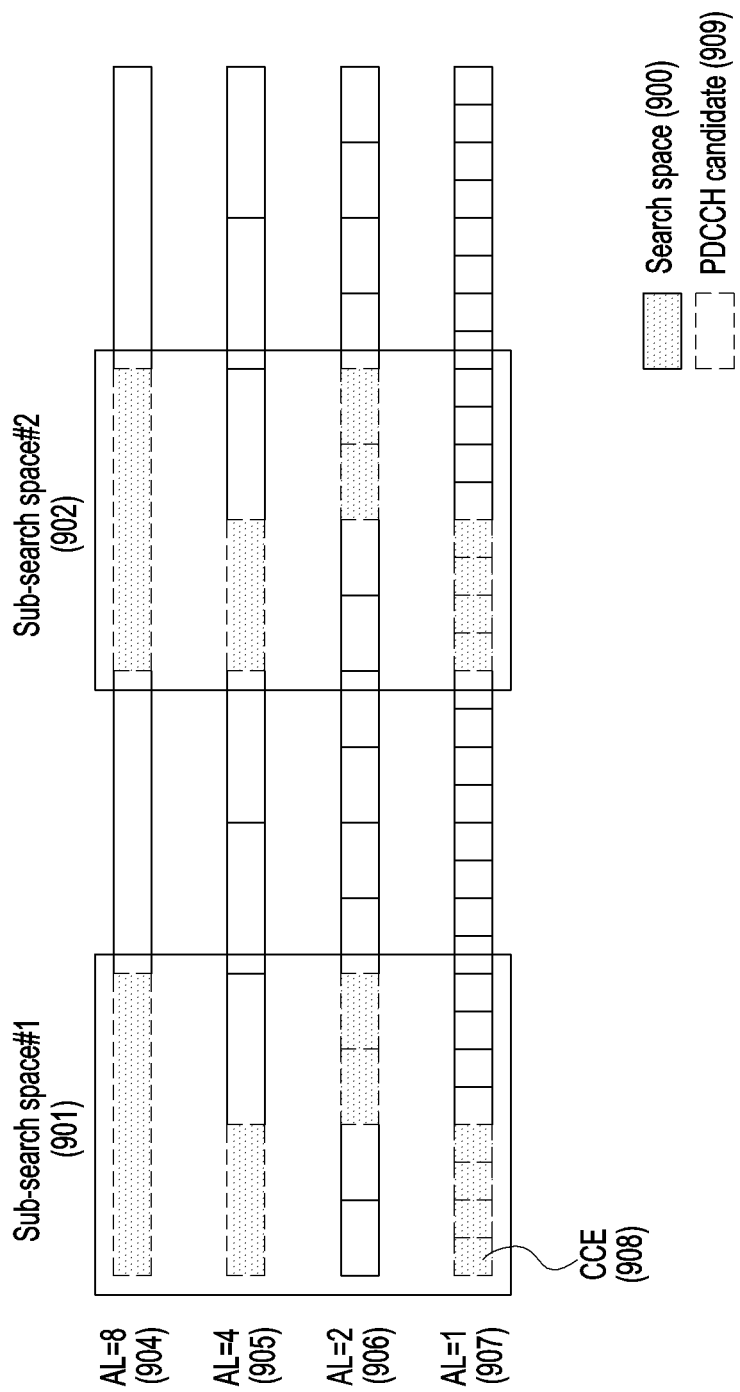
FIG. 9 is a view illustrating a search space of a 5G download control channel according to embodiment 2 of the disclosure.

FIG. 9 is a view illustrating a search space of a 5G download control channel according to embodiment 2 of the disclosure.

Referring to FIG. 9, an example of a search space 900 constituted of a set of PDCCH candidates 909 in each aggregation level 904, 905, 906, or 907. Reference number 908 represents an example of a CCE. One search space 900 may include one or more partial search spaces 901 and 902. In this case, the number of PDCCH candidates 909 at each aggregation level in each partial search space may be the same. For example, the whole search space may consist of partial search space X and partial search space Y, partial search spaces X and Y, each, may be constituted of a total of N PDCCH candidates, and the whole search space may be constituted of a total of 2N PDCCH candidates.

For example, according to the second embodiment of the disclosure, the search space may be defined as follows.

The nth partial search space may be expressed as follows.

$$S_k^{(L)}(n)=f(Y_k(n),N_{CCE,k}(n)N_{cand}^{(L)},L,x) \qquad \text{Equation 3}$$

In Equation 3, f(•) means any function. For example, it may be obtained from Equation 4 below.

$$f=L\{(Y_K+m')\bmod \lfloor N_{CCE,k}/L \rfloor\}+i$$

$$i=0,1,\ldots,L-1$$

$$m=0,1,\ldots,N_{cand}^{(L)}-1$$

$$m'=m+N_{cand}^{(L)\cdot x} \qquad \text{Equation 4}$$

The CCE index set following A) may constitute the search space. $S_k^{(L)}$ may be defined as the search space corresponding to aggregation level (AL)=L in the kth slot, i.e., a set of PDCCH candidates. $Y_k$, a parameter for determining the search space in the kth slot, may be defined as $Y_k=f(Y_{k-1}, A,D)$. Here, A and D are any constants, and $Y_{-1}$ may be a pre-defined, fixed value, may be set by the base station, or may be defined as, e.g., the UE ID or group ID. $N_{CCE,k}$ may mean the number of CCEs present in the control region in the kth slot. L means the AL, and $N_{cand}^{(L)}$ may mean the number of PDCCH candidates corresponding to AL=L. x may mean other system parameters to determine other search spaces. They may be, e.g., the cell ID, synchronization signal block index, component carrier index, and bandwidth part index. In the foregoing, it may be the same regardless of the partial search space index.

As per Equation 2 above, each partial search space may independently be configured while they have the same number of PDCCH candidates.

Or, the nth partial search space may be constituted of a set of CCE indexes that are offset by a particular value from those of the 0th partial search space. That is, it may be represented in Equation 5 below.

$$S_k^{(L)}(n)=S_k^{(L)}(0)+\Delta(n)\bmod N_{CCE,k} \qquad \text{Equation 5}$$

In Equation 5, $\Delta(n)$ may be the CCE index offset value or a value fixed in the system parameter or may be set for the UE by the BS via higher layer signaling (e.g., RRC signaling).

The above-described whole search space constituted of N partial search spaces may be expressed as shown in Equation 6 below.

$$S_k^{(L)} = \bigcup_{n=1}^{N} S_k^{(L)}(n) \qquad \text{Equation 6}$$

In the method for determining the number of PDCCH candidates, the number of PDCCH candidates at each AL=L may be 2 raised to the power of a particular number, e.g., $2^{j(L)}$. Here, j(L) may be a natural number equal or larger than 0. This may be represented as shown in Table 8.

TABLE 8

| AL = 1 | AL = 2 | AL = 4 | AL = 8 |
| --- | --- | --- | --- |
| $2^{j(1)}$ | $2^{j(2)}$ | $2^{j(4)}$ | $2^{j(8)}$ |

FIG. 9 illustrates an example in which the whole search space 900 consists of two partial search spaces, e.g., partial search space #1 901 and partial search space #2 902. In the example of FIG. 9, partial search space #1 901 and partial search space #2 902 both may have the same number of PDCCH candidates, following Table 9 below.

TABLE 9

| AL = 1 (907) | AL = 2 (906) | AL = 4 (905) | AL = 8 (904) | sum |
| --- | --- | --- | --- | --- |
| 4 | 2 | 1 | 1 | 8 |

Accordingly, the number of PDCCH candidates constituting the whole search space 900 may follow Table 10 below.

TABLE 10

| AL = 1 (907) | AL = 2 (906) | AL = 4 (905) | AL = 8 (904) | sum |
| --- | --- | --- | --- | --- |
| 8 | 4 | 2 | 2 | 16 |

The BS may configure a search space agreed on with the UE by the above-described methods and may transmit the download control information for the UE in a particular PDCCH candidate in the search space. The UE may recognize its search space by the above-described methods, may perform blind decoding on the PDCCH candidates in the search space, and may receive the download control information from the BS based thereupon.

Embodiment 2-1

According to embodiment 2-1 of the disclosure, there is proposed designing a search space considering the nested structure.

According to the disclosure, the search space of a particular aggregation level (AL) may be constituted of CCEs present in a set of CCEs constituting the search space of a reference aggregation level. In other words, where the CCE set constituting the search space of the reference aggregation level is A, and the search space of the particular aggregation level is B, search space BB may be determined to meet B ⊂ A.

At this time, the reference aggregation level may be determined by the following methods.

[Method 1]

The reference aggregation level may be the highest aggregation level. For example, assuming that supportable aggregation levels are {1, 2, 4, 8}, the highest aggregation level, 8, may be the reference aggregation level, and the search spaces of the aggregation levels {1, 2, 4} may be configured to be partial sets of the search space of aggregation level 8.

[Method 2]

The reference aggregation level may be the highest one of aggregation levels set for the UE. For example, where supportable aggregation levels are {1, 2, 4, 8}, and the BS sets the UE to monitor the aggregation levels {1, 2, 4}, the reference aggregation level may be 4 which is the highest one of the set aggregation levels. Accordingly, the search spaces of aggregation levels {1, 2} may be configured to be partial sets of the search space of aggregation level 4.

[Method 3]

The reference aggregation level may be set for the UE by the base station. For example, where supportable aggregation levels are {1, 2, 4, 8}, and the BS sets the UE to monitor the aggregation levels {1, 2, 4}, the BS may set, for the UE, 8 as the reference aggregation level. In this case, the search spaces of aggregation levels {1, 2, 4} may be configured to be partial sets of the search space of aggregation level 8. At this time, the UE may not monitor the search space of aggregation level 8 and may only use it for the purpose of configuring the search spaces of aggregation levels {1, 2, 4}.

Third Embodiment

According to the third embodiment of the disclosure, there is proposed a method for determining the initial sequence value of the DMRS transmitted to decode the PDCCH.

The RS sequence available for the DMRS of the PDCCH may be defined as follows, for example.

$$r(m) = \frac{1}{\sqrt{2}}(1 - 2 \cdot c(2m)) + j\frac{1}{\sqrt{2}}(1 - 2 \cdot c(2m+1)) \quad \text{Equation 7}$$

In Equation 7, r(m) is the signal modulated by quadrature phase shift keying (QPSK), c(m) is the binary pseudo-random sequence, and m is the index. The initial sequence used to generate pseudo-random sequence c may be defined as follows.

$$c_{init} = \lfloor n_s/2 \rfloor + 1) \cdot (2n_{ID}^{PDCCH} + 1) \cdot 2^c + b \quad \text{Equation 8}$$

For the common search space present in the control region set by the MIB, $n_{ID}^{PDCCH}$ in Equation 8 may be determined based on a parameter, such as cell ID, TRP ID, or synchronization signal block index, or based on a value configured by combining the parameters.

For the common search space present in the control region set by the RRC, $n_{ID}^{PDCCH}$ in Equation 8 may be determined based on a parameter, such as cell ID, TRP ID, or synchronization signal block index, component carrier index, or bandwidth part index, or based on a value configured by combining the parameters.

For the UE-specific search space present in the control region set by the RRC, $n_{ID}^{PDCCH}$ in Equation 8 may be determined based on a parameter, such as cell ID, TRP ID, or synchronization signal block index, component carrier index, bandwidth part index, UE ID, or virtual cell ID set with the RRC by the BS or based on a value configured by combining the parameters.

The BS may determine the PDCCH DMRS initial sequence agreed on with the UE as per the above-described methods and may transmit the DMRS in the sequence. The UE may determine the PDCCH DMRS initial sequence agreed on with the BS by the above-described methods, receive the DMRS assuming the sequence, and perform channel estimation.

Figure 10:
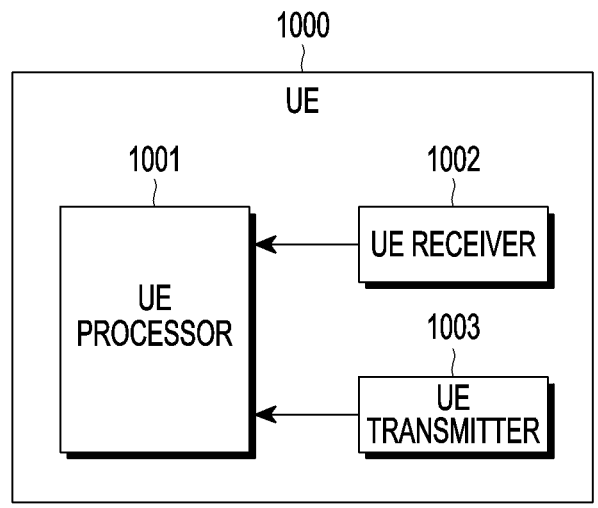
FIG. 10 is a block diagram illustrating a configuration of a user equipment (UE) according to an embodiment of the disclosure.
Figure 11:
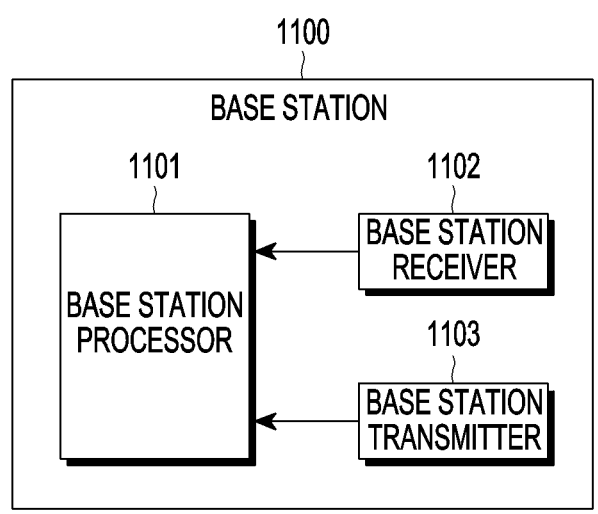
FIG. 11 is a block diagram illustrating a configuration of a base station (BS) according to an embodiment of the disclosure.

FIGS. 10 and 11 illustrate transmitters, receivers, and processors of a UE and a BS available to perform the above-described embodiments of the disclosure. FIGS. 10 and 11 illustrate the structure of the BS and UE to perform the interleaving method in the 5G communication system, method for setting parameters related to interleaving, method for configuring the search space, and method for determining the sequence for the PDCCH DMRS. To perform the methods, the transmitters, receivers, and processors of the BS and the UE may be operated as per the embodiments.

FIG. 10 is a block diagram illustrating a configuration of a UE according to an embodiment of the disclosure.

Referring to FIG. 10, according to the disclosure, the UE 1000 may include a UE processor 1001, a UE receiver 1002, and a UE transmitter 1003. The UE 1000 may add other elements. As necessary or optionally, any one or more of the UE processor 1001, the UE receiver 1002, and the UE transmitter 1003 may be omitted.

The UE processor 1001 may control a series of operations of the UE 1000 as per the above-described embodiments. For example, according to an embodiment, the UE processor 1001 may differently control the operations as per the interleaving method, the method for setting the interleaving-related parameters, the search space configuring method, and the method for determining the sequence for the PDCCH DMRS. Meanwhile, as an example, the UE processor 1001 may include at least one processor (e.g., a CPU or a graphics processing unit (GPU) or both). The UE receiver 1002 and the UE transmitter 1003 may collectively be referred to as a transceiver (or communication interface) according to an embodiment. The transceiver may transmit or receive signals to/from the base station. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the UE processor 1001, and transmit signals output from the UE processor 1001 via a radio channel. Meanwhile, the UE processor 1001 may control the operations of the UE according to a combination of at least one or two or more of the above-described first to third embodiments of the disclosure.

The UE 1000 may further include a storage unit configured to store a basic program for operating the UE 1000, application programs, control information or other data. Further, the storage unit may include at least one storage medium of a flash memory-type, hard disk-type, multimedia card-type, a micro card-type, or other-type memory (e.g., a secure digital (SD) or an extreme digital (xD) memory), a magnetic memory, a magnetic disk, an optical disc, a random access memory (RAM), a static RAM (SRAM), a read only memory (ROM), a programmable ROM (PROM), or an electrically erasable PROM (EEPROM). The UE processor 1001 may perform various operations using various programs, contents, or data stored in the storage unit.

FIG. 11 is a block diagram illustrating a configuration of a BS according to an embodiment of the disclosure.

Referring to FIG. 11, according to the disclosure, the BS 1100 may include a base station processor 1101, a base station receiver 1102, and a base station transmitter 1103. The BS 1100 may add other elements. As necessary or optionally, any one or more of the BS processor 1101, the BS receiver 1102, and the BS transmitter 1103 may be omitted.

The BS processor 1101 may control a series of operations of the base station 1100 as per the above-described embodiments. For example, according to an embodiment, the UE processor 1001 may differently control the operations as per the interleaving method, the method for setting the interleaving-related parameters, the search space configuring method, and the method for determining the sequence for the PDCCH DMRS. As necessary, the BS processor 1101 may perform control to transmit various additional indicators and configuration information. Meanwhile, as an example, the BS processor 1101 may include at least one processor (e.g., a CPU or a graphics processing unit (GPU) or both). The BS receiver 1102 and the BS transmitter 1103 may collectively be referred to as a transceiver (or communication interface) according to an embodiment. The transceiver may transmit or receive signals to/from the UE. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the BS processor 1101, and transmit signals output from the BS processor 1101 via a radio channel. Meanwhile, the BS processor 1101 may control the operations of the BS according to a combination of at least one or two or more of the above-described first to third embodiments of the disclosure.

The BS 1100 may further include a storage unit configured to store a basic program for operating the BS 1100, application programs, control information or other data. The BS processor 1101 may perform various operations using various programs, contents, or data stored in the storage unit.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination. For example, the first, second, and third embodiments of the disclosure may partially be combined and be operated by the BS and the UE. Although the embodiments are proposed in association with new radio (NR) systems, various modifications thereto may apply to other various systems, such as frequency division duplex (FDD) or time division duplex (TDD) LTE systems.

Although preferred embodiments of the disclosure have been shown and described in connection with the drawings and particular terms have been used, this is to provide a better understanding of the disclosure and is not intended to limit the scope of the disclosure. It is apparent to one of ordinary skill in the art that various changes may be made thereto without departing from the scope of the disclosure.

The above-described operations may be realized by equipping a memory device retaining their corresponding codes in any component of the server or terminal device of the communication system. That is, the processor in the BS or UE may execute the above-described operations by reading and running the program codes stored in the memory device by a processor or CPU.

As described herein, various components or modules in the server or terminal device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   transmitting, from a base station, a configuration of a reference aggregation level;
   identifying a search space set, for the terminal, including a plurality of sub-search spaces, wherein an aggregation level search space of a sub-search space is a subset of a reference aggregation level search space of the sub-search space, and a number of physical downlink control channel (PDCCH) candidates for each of the plurality of sub-search spaces is the same; and
   receiving, from the base station, downlink control information by monitoring a PDCCH candidate of the search space set,
   wherein the aggregation level search space is set to be monitored for the downlink control information and the reference aggregation level search space is not monitored for the downlink control information.

2. The method of claim 1, further comprising:
   receiving, from the base station, information configuring a scaling factor associated with a blind decoding number,
   wherein a number of the PDCCH candidates monitored for the downlink control information is identified by multiplying the scaling factor with a total number of PDCCH candidates of the search space set.

3. The method of claim 1,
   wherein a number of PDCCH candidates for each aggregation levels is same for the plurality of sub-search spaces, and
   wherein the number of PDCCH candidates for each aggregation level is a power of 2.

4. The method of claim 1, wherein a control channel element (CCE) index offset between a first sub-search space and a second sub-search space is configured by a higher layer signaling from the base station.

5. The method of claim 1,
   wherein a specific aggregation level search space consists of at least one control channel element (CCE) of a CCE set for the reference aggregation level search space, and
   wherein, in case that supportable aggregation levels are {1,2,4,8}, aggregation levels to be monitored are {1,2,4}, and the reference aggregation level configured by the base station is {8}, an aggregation level {8} search space is used to configure aggregation level {1, 2, 4} search spaces and is not monitored for the downlink control information.

6. A method performed by a base station in a wireless communication system, the method comprising:
   transmitting, to a terminal, a configuration of a reference aggregation level;
   identifying a search space set, for the terminal, including a plurality of sub-search spaces, wherein an aggregation level search space of a sub-search space is a subset of a reference aggregation level search space of the sub-search space, and a number of physical downlink control channel (PDCCH) candidates for each of the plurality of sub-search spaces is the same; and
   transmitting, to the terminal, downlink control information on a PDCCH candidate of the search space set,
   wherein the aggregation level search space is set to be monitored for the downlink control information and the reference aggregation level search space is not monitored for the downlink control information.

7. The method of claim 6, further comprising:
   transmitting, to the terminal, information configuring a scaling factor associated with a blind decoding number,
   wherein a number of the PDCCH candidates monitored for the downlink control information is identified by multiplying the scaling factor with a total number of PDCCH candidates of the search space set.

8. The method of claim 6,
   wherein a number of PDCCH candidates for each aggregation levels is same for the plurality of sub-search spaces, and
   wherein the number of PDCCH candidates for each aggregation level is a power of 2.

9. The method of claim 6, wherein a control channel element (CCE) index offset between a first sub-search space and a second sub-search space is configured by a higher layer signaling to the terminal.

10. The method of claim 6,
    wherein a specific aggregation level search space consists of at least one control channel element (CCE) of a CCE set for the reference aggregation level search space, and
    wherein, in case that supportable aggregation levels are {1,2,4,8}, aggregation levels to be monitored are {1,2,4}, and the reference aggregation level configured by the base station is {8}, an aggregation level {8} search space is used to configured aggregation level {1,2,4} search spaces and is not monitored for the downlink control information.

11. A terminal in a wireless communication system, the terminal comprising:
    a transceiver configured to transmit and receive a signal; and
    a controller configured to:
       receive, from a base station, a configuration of a reference aggregation level,
       identify a search space set, for the terminal, including a plurality of sub-search spaces, wherein an aggregation level search space of a sub-search space is a subset of a reference aggregation level search space of the sub-search space, and a number of physical downlink control channel (PDCCH) candidates for each of the plurality of sub-search spaces is the same, and
       receive, from the base station, downlink control information by monitoring a PDCCH candidate of the search space set,
    wherein the aggregation level search space is set to be monitored for the downlink control information and the reference aggregation level search space is not monitored for the downlink control information.

12. The terminal of claim 11,
    wherein the controller is further configured to receive, from the base station, information configuring a scaling factor associated with a blind decoding number, and
    wherein a number of the PDCCH candidates monitored for the downlink control information is identified by multiplying the scaling factor with a total number of PDCCH candidates of the search space set.

13. The terminal of claim 11,
    wherein a number of PDCCH candidates for each aggregation levels is same for the plurality of sub-search spaces, and wherein the number of PDCCH candidates for each aggregation level is a power of 2.

14. The terminal of claim 11, wherein a control channel element (CCE) index offset between a first sub-search space and a second sub-search space is configured by a higher layer signaling from the base station.

15. The terminal of claim 11,
wherein a specific aggregation level search space consists of at least one control channel element (CCE) a CCE set for the reference aggregation level search space, and
wherein, in case that supportable aggregation levels are {1,2,4,8}, aggregation levels to be monitored are {1,2,4}, and the reference aggregation level configured by the base station is {8}, an aggregation level {8} search space is used to configure aggregation level {1, 2, 4} search spaces and is not monitored for the downlink control information.

16. A base station in a wireless communication system, the base station comprising:
a transceiver configured to transmit and receive a signal; and
a controller configured to:
transmit, to a terminal, a configuration of a reference aggregation level,
identify a search space set, for a terminal, including a plurality of sub-search spaces, wherein an aggregation level search space of a sub-search space is a subset of a reference aggregation level search space of the sub-search space, and a number of physical downlink control channel (PDCCH) candidates for the plurality of sub-search spaces is the same, and
transmit, to the terminal, downlink control information on a PDCCH candidate of the search space set,
wherein the aggregation level search space is set to be monitored for the downlink control information and the reference aggregation level search space is not monitored for the downlink control information.

17. The base station of claim 16,
wherein the controller is further configured to transmit, to the terminal, information configuring a scaling factor associated with a blind decoding number, and
wherein a number of the PDCCH candidates monitored for the downlink control information is identified by multiplying the scaling factor with a total number of PDCCH candidates of the search space set.

18. The base station of claim 16,
wherein a number of PDCCH candidates for each aggregation levels is same for the plurality of sub-search spaces, and
wherein the number of PDCCH candidates for each aggregation level is a power of 2.

19. The base station of claim 16, wherein a control channel element (CCE) index offset between a first sub-search space and a second sub-search space is configured by a higher layer signaling to the terminal.

20. The base station of claim 16,
wherein a specific aggregation level search space consists of at least one control channel element (CCE) of a CCE set for the reference aggregation level search space, and
wherein, in case that supportable aggregation levels are {1,2,4,8}, aggregation levels to be monitored are {1,2,4}, and the reference aggregation level configured by the base station is {8}, an aggregation level {8} search space is used to configured aggregation level {1,2,4} search spaces and is not monitored for the downlink control information.

* * * * *